(12) United States Patent (10) Patent No.: US 8,321,302 B2
Bauer et al. (45) Date of Patent: Nov. 27, 2012

(54) INVENTORY MANAGEMENT SYSTEM

(75) Inventors: Donald G. Bauer, Laurel, MD (US); Richard J. Campero, Ellicott City, MD (US); Paul B. Rasband, Frederick, MD (US); Martin D. Weel, Coto De Caza, CA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 2428 days.

(21) Appl. No.: 10/348,941

(22) Filed: Jan. 23, 2003

(65) Prior Publication Data

US 2003/0216969 A1 Nov. 20, 2003

Related U.S. Application Data

(60) Provisional application No. 60/350,023, filed on Jan. 23, 2002.

(51) Int. Cl.
*G06Q 10/00* (2006.01)
*G06Q 30/00* (2006.01)
(52) U.S. Cl. ............................. 705/28; 705/22
(58) Field of Classification Search .................. None
See application file for complete search history.

(56) References Cited

U.S. PATENT DOCUMENTS

| | | | |
|---|---|---|---|
| 4,673,932 A | 6/1987 | Ekchian et al. .......... 340/825.54 |
| 4,688,062 A | 8/1987 | Liles | |
| 4,737,910 A | 4/1988 | Kimbrow | |
| 4,766,295 A | 8/1988 | Davis et al. | |
| 4,783,740 A | 11/1988 | Ishizawa et al. | |
| 4,814,742 A | 3/1989 | Morita et al. | |
| 4,937,586 A | 6/1990 | Stevens et al. | |
| 4,951,029 A | 8/1990 | Severson | |
| 5,168,445 A | 12/1992 | Kawashima et al. | |
| 5,198,644 A | 3/1993 | Pfeiffer et al. | |
| 5,231,273 A | 7/1993 | Caswell et al. | |
| 5,241,467 A | 8/1993 | Failing et al. | |
| 5,313,392 A | 5/1994 | Temma et al. | |
| 5,313,569 A | 5/1994 | Olsson et al. | |
| 5,349,332 A | 9/1994 | Ferguson et al. | |
| 5,434,775 A | 7/1995 | Sims et al. | |

(Continued)

FOREIGN PATENT DOCUMENTS

EP 0856812 A2 8/1998

(Continued)

OTHER PUBLICATIONS

Auto-ID Center-About The Technology, www.autoidcenter.org/aboutthetech_idiotsguide.asp, 2002, visited Jun. 12, 2003, pp. 1-12.

(Continued)

*Primary Examiner* — Mussa A Shaawat
(74) *Attorney, Agent, or Firm* — Kacvinsky Daisak PLLC

(57) ABSTRACT

Methods, systems, and articles of manufacture consistent with certain aspects related to the present invention collect item information from RFID tags attached to items in an inventory, and uses the collected item information to perform various inventory management processes. In one aspect, the inventory management processes may include determining, reporting, and/or providing corrective actions for one or more events associated with at least one of depletions of items in the inventory, changes in the design of items in the inventory, defects with one or more items, misplaced items, the movement of an unusual umber of items within a short period of time (i.e., shrinkage), and malfunctions of one or more components included in the environment.

35 Claims, 7 Drawing Sheets

U.S. PATENT DOCUMENTS

| | | | |
|---|---|---|---|
| 5,461,385 A | | 10/1995 | Armstrong |
| 5,539,394 A | | 7/1996 | Cato et al. |
| 5,548,282 A | | 8/1996 | Escritt et al. |
| 5,572,653 A | * | 11/1996 | DeTemple et al. ............ 345/501 |
| 5,602,556 A | | 2/1997 | Bowers |
| 5,604,923 A | | 2/1997 | Wilkus |
| 5,648,765 A | | 7/1997 | Cresap et al. |
| 5,671,362 A | | 9/1997 | Cowe et al. |
| 5,704,049 A | | 12/1997 | Briechle |
| 5,727,153 A | | 3/1998 | Powell |
| 5,745,036 A | | 4/1998 | Clare |
| 5,777,561 A | | 7/1998 | Chieu et al. |
| 5,794,213 A | | 8/1998 | Markman |
| 5,798,693 A | | 8/1998 | Engellenner |
| 5,812,985 A | | 9/1998 | Failing et al. |
| 5,818,346 A | | 10/1998 | Goodwin, III et al. |
| 5,822,714 A | | 10/1998 | Cato |
| 5,832,496 A | | 11/1998 | Ludwig |
| 5,850,187 A | | 12/1998 | Carrender et al. |
| 5,884,278 A | | 3/1999 | Powell |
| 5,886,634 A | | 3/1999 | Muhme |
| 5,887,176 A | | 3/1999 | Griffith et al. |
| 5,920,261 A | | 7/1999 | Hughes et al. |
| 5,926,797 A | | 7/1999 | Goodwin, III |
| 5,936,527 A | | 8/1999 | Isaacman et al. |
| 5,953,707 A | | 9/1999 | Krasinski et al. |
| 5,963,173 A | | 10/1999 | Lian et al. |
| 5,963,920 A | | 10/1999 | Rose et al. |
| 5,990,794 A | | 11/1999 | Alicot et al. |
| 5,995,015 A | | 11/1999 | DeTemple et al. |
| 6,005,530 A | | 12/1999 | Jovanovich et al. |
| 6,011,487 A | | 1/2000 | Plocher |
| 6,011,958 A | | 1/2000 | Yokota et al. |
| 6,012,041 A | | 1/2000 | Brewer et al. |
| 6,016,481 A | | 1/2000 | Failing, Jr. et al. |
| 6,032,127 A | * | 2/2000 | Schkolnick et al. ............ 705/23 |
| 6,043,792 A | | 3/2000 | Finlayson |
| 6,055,509 A | | 4/2000 | Powell |
| 6,061,552 A | | 5/2000 | Cerasini et al. |
| 6,070,803 A | | 6/2000 | Stobbe |
| 6,078,251 A | | 6/2000 | Landt et al. |
| 6,094,173 A | | 7/2000 | Nylander |
| 6,105,002 A | | 8/2000 | Powell |
| 6,105,004 A | | 8/2000 | Halperin et al. |
| 6,108,367 A | | 8/2000 | Herman et al. |
| 6,112,988 A | | 9/2000 | Powell |
| 6,127,917 A | | 10/2000 | Tuttle |
| 6,127,928 A | | 10/2000 | Issacman et al. |
| 6,130,603 A | | 10/2000 | Briechle |
| 6,138,105 A | | 10/2000 | Walker et al. |
| 6,150,921 A | | 11/2000 | Werb et al. |
| 6,151,582 A | | 11/2000 | Aviv et al. |
| 6,173,891 B1 | | 1/2001 | Powell |
| 6,182,053 B1 | | 1/2001 | Rauber et al. |
| 6,184,841 B1 | | 2/2001 | Shober et al. |
| 6,195,006 B1 | | 2/2001 | Bowers et al. |
| 6,204,764 B1 | | 3/2001 | Maloney |
| 6,236,335 B1 | | 5/2001 | Goodwin, III |
| 6,271,756 B1 | | 8/2001 | Davies, Jr. et al. |
| 6,294,997 B1 | | 9/2001 | Paratore et al. |
| 6,317,027 B1 | | 11/2001 | Watkins |
| 6,317,650 B1 | | 11/2001 | Hartley |
| 6,327,576 B1 | * | 12/2001 | Ogasawara ..................... 705/22 |
| 6,335,686 B1 | | 1/2002 | Goff et al. |
| 6,339,762 B1 | | 1/2002 | Powell |
| 6,341,269 B1 | | 1/2002 | Dulaney et al. |
| 6,341,271 B1 | | 1/2002 | Salvo et al. |
| 6,344,794 B1 | | 2/2002 | Ulrich et al. |
| 6,354,495 B1 | | 3/2002 | Powell |
| 6,369,694 B1 | | 4/2002 | Mejia |
| 6,392,544 B1 | | 5/2002 | Collins et al. |
| 6,397,199 B1 | | 5/2002 | Goodwin, III |
| 6,418,416 B1 | | 7/2002 | Rosenberg et al. |
| 6,419,154 B1 | | 7/2002 | Dalton et al. |
| 6,427,913 B1 | | 8/2002 | Maloney |
| 6,433,671 B1 | | 8/2002 | Nysen |
| 6,445,297 B1 | | 9/2002 | Nicholson |
| 6,450,406 B2 | | 9/2002 | Brown |
| 6,462,656 B2 | | 10/2002 | Ulrich et al. |
| 6,483,427 B1 | | 11/2002 | Werb |
| 6,486,780 B1 | | 11/2002 | Garber et al. |
| 6,496,806 B1 | * | 12/2002 | Horwitz et al. ................. 705/28 |
| 6,502,012 B1 | | 12/2002 | Nelson |
| 6,557,760 B2 | * | 5/2003 | Goodwin, III ................ 235/383 |
| 6,598,025 B1 | * | 7/2003 | Hamilton et al. ............... 705/22 |
| 6,601,764 B1 | * | 8/2003 | Goodwin, III ................ 235/385 |
| 6,622,127 B1 | * | 9/2003 | Klots et al. ...................... 705/28 |
| 6,747,560 B2 | | 6/2004 | Stevens |
| 6,870,464 B2 | * | 3/2005 | Okamura ................... 340/10.51 |
| 7,050,991 B2 | * | 5/2006 | Ogasawara ..................... 705/22 |
| 7,222,786 B2 | * | 5/2007 | Renz et al. ..................... 235/385 |
| 7,398,232 B2 | * | 7/2008 | Renz et al. ...................... 705/28 |
| 2001/0016800 A1 | | 8/2001 | Chia et al. |
| 2001/0049690 A1 | | 12/2001 | McConnell et al. ........ 707/104.1 |
| 2001/0051905 A1 | | 12/2001 | Lucas |
| 2002/0029153 A1 | * | 3/2002 | Lee et al. ........................... 705/1 |
| 2002/0038267 A1 | | 3/2002 | Can et al. ........................ 705/28 |
| 2002/0143635 A1 | * | 10/2002 | Goodwin, III .................. 705/22 |
| 2002/0147649 A1 | * | 10/2002 | White ............................. 705/20 |
| 2002/0161651 A1 | * | 10/2002 | Godsey et al. .................. 705/22 |
| 2003/0014314 A1 | * | 1/2003 | Griep et al. ..................... 705/15 |
| 2003/0055707 A1 | * | 3/2003 | Busche et al. .................. 705/10 |
| 2003/0088442 A1 | * | 5/2003 | Michael et al. .................... 705/3 |
| 2003/0154141 A1 | * | 8/2003 | Capazario et al. .............. 705/27 |
| 2004/0024730 A1 | * | 2/2004 | Brown et al. ..................... 707/1 |
| 2006/0143095 A1 | * | 6/2006 | Sandus et al. ................... 705/26 |
| 2007/0124216 A1 | * | 5/2007 | Lucas .............................. 705/27 |
| 2007/0219916 A1 | * | 9/2007 | Lucas .............................. 705/58 |

FOREIGN PATENT DOCUMENTS

| | | |
|---|---|---|
| EP | 1185953 | 11/2000 |
| GB | 2 354 620 A | 3/2001 |
| JP | 2000113077 | 4/2000 |
| JP | 2000123096 | 4/2000 |
| JP | 2000198511 | 7/2000 |
| JP | 2000306015 | 11/2000 |
| JP | 2001134643 | 5/2001 |
| JP | 2001344464 | 12/2001 |
| WO | WO 99/62269 | 12/1999 |
| WO | 00/48016 | 8/2000 |
| WO | WO 00/65532 | 11/2000 |
| WO | 01/80133 | 10/2001 |
| WO | WO 01-75552 A2 | 10/2001 |
| WO | WO 01-76423 A2 | 10/2001 |
| WO | WO 02/01467 A2 | 1/2002 |
| WO | WO 02 01467 A2 | 1/2002 |

OTHER PUBLICATIONS

Ashton, K., "T2T—The Next Wave of the Internet Revolution," Massachusetts Institute of Technology Auto-ID Center, Sep. 6, 2000, pp. 1-56.

Brock, D., "Intelligent Infrastructure—A Method for Networking Physical Objects," Massachusetts Institute of Technology Auto-ID Center, Apr. 2000, pp. 1-26.

Cover, R., "Oasis—The XML Cover Pages, WAP Wireless Markup Language Specification (WML)," Online, http://www.oasis-open.org/cover/wap-wml.html, visited Apr. 18, 2000, pp. 1-12.

Joshi, Y., "Information Visibility and Its Effect on Supply Chain Dynamics," Massachusetts Institute of Technology, Jun. 2000, pp. 1-67.

"Smart World," The MIT Report, vol. 28, No. 1, Feb. 2000, pp. 1-11.

"Smart Environments," The MIT Report, vol. 28, No. 2, Mar. 2000, pp. 1-11.

"Philips Semiconductors and IBM Research to Co-develop Secure Smart Cards," On the Move, Philips Semiconductors, Feb./Mar. 1999, pp. 1-11.

Siu, K., "Advances in Internet Infrastructure," Massachusetts Institute of Technology, Apr. 12, 2000, pp. 1-19.

Siu, K., "Wireless Multimedia Systems: Next Generation & Beyond," Massachusetts Institute of Technology, May 11, 1999, pp. 1-20.

Smart World, "A Preview of the Next Wave of Internet and eCommerce Applications," MIT Industrial Liaison Program & MIT Auto-ID Center, Apr. 12-13, 2000, pp. 1-3.

"Smart World in the New Millennium," MIT Auto-ID Center, Apr. 2000, pp. 1-9.

"International Paper and Motorola Agree to Put Microchips in 'Smart Packages,'" The Wall Street Journal—Technology Journal, Apr. 13, 2000, pp. 1-8.

Whitted, T., "Software and Devices," Microsoft® Research, Apr. 12, 2000, pp. 1-21.

Zue, V., "The MIT Oxygen Project," Massachusetts Institute of Technology, Apr. 12, 2000, pp. 1-5.

Cantwell, Richard J., "The Gillette Company, Impact on Business and Industry," Slide Presentation, Apr. 12, 2000, pp. 1-23.

* cited by examiner

INVENTORY MANAGEMENT SYSTEM

RELATED APPLICATIONS

This application claims the benefit of U.S. Provisional Patent Application No. 60/350,023, filed Jan. 23, 2002, the disclosure of which is expressly incorporated herein by reference in its entirety. Further, this application is a continuation-in-part of U.S. patent application Ser. No. 10/348,941, filed Jan. 9, 2003, for "Intelligent Station Using Multiple RF Antennae and Inventory Control System and Method Incorporating Same" the disclosure of which is also incorporated herein by reference in its entirety.

FIELD OF THE INVENTION

This invention relates to inventory management systems and, more particularly, to methods and systems for performing an inventory management process that uses an intelligent station to track and/or inventory items that are tagged with Radio Frequency Identification (RFID) tags.

BACKGROUND OF THE INVENTION

Inventory management is becoming increasingly important in today's growing economy. New products are continuously being developed and placed in the market for consumer purchase. Although this growth provides consumers with more choices for selecting various goods and services, businesses (e.g., retailers, wholesalers, etc.) are tasked with managing this growing inventory.

To manage growing product inventories, businesses have implemented perpetual type inventory management systems, which are systems that use Point Of Sale (POS) data on products sold, invoicing data, and historical data on inventory audits or cycle counts (e.g., periodic inventory counts of products) to determine the inventory that exists within the walls of a retail store. POS data generally refers to data generated at a checkout system (i.e., cash register). Based on the inventory level within the retail stores, products may be reordered from a manufacturer. Alternatively, the manufacturer and retailer may have an agreement that directs the manufacturer to preemptively deliver products according to the terms of the agreement. Ideally, inventory is replenished in a manner such that inventory arrives at the retail store just before existing stock levels are exhausted.

Although perpetual inventory management systems alleviate some of the burden in managing large inventories, they employ a management that injects inaccuracies in cycle counts, POS scanning data, redundant re-ordering, misdirected shipments, and/or unusual sales velocity (i.e., the sale of products that take place either too fast or too slow). The result is physical (actual) inventory out-of-stock levels as high as 11-12 percent or even much higher for specially promoted products or products that are closely monitored for safety purposes (e.g., products with expiration dates).

Another shortcoming associated with perpetual inventory management systems includes inventory shrinkage, also described as the reduction of inventory due to non-sale circumstances. For example, shrinkage may occur at any point in a supply chain, stemming from invoice errors, vendor fraud, misdirected shipments, retail employee theft and customer theft. If inventory is computed as described above (i.e., using perpetual inventory management techniques), shrinkage rates (amounting to several percent of sales) can cause divergence of theoretical (i.e., inventory that is proposed or planned) and physical inventory. Another problem with perpetual inventory management systems is the uncertainty associated with the effectiveness of product promotions. For instance, if the relationship between price and inventory velocity, known as price elasticity, is not well understood, promotions can cause an out-of-stock condition that negatively impacts customer satisfaction and loyalty. Alternatively, promotions can fail to achieve a desired reduction of inventory when too much inventory is ordered and the price elasticity is poorly estimated or measured.

Further, another related problem with conventional inventory management systems is associated with misplaced inventory on a retail shelf or similar support unit. Product manufacturers devote large sums of money to market certain products to consumers. In some instances, this marketing may include combating a competitor that manufacturers a similar product. Because retailers generally desire to present as much inventory as possible for sale to the customer, some employees may fill a void on a shelf dedicated for an out of stock product with related products. In some instances, the related products may include products produced by a manufacturer's competitor. This may result in lost sales for the manufacturer and, in some cases, reduction in customer satisfaction. This may also violate agreements between retailers and manufacturers or their distributors.

To address the shortcomings of conventional inventory management systems, businesses have begun to incorporate wireless identification devices to assist in managing the inventory of products. This advancement contemplates attaching Radio Frequency Identification (RFID) tags on products during manufacture or when the products are stored in a warehouse. Each RFID tag includes an Integrated Circuit (IC) that enables the tag to have a unique identification number. Therefore, when a product is taken from a warehouse and placed on a retail shelf, for example, the products may be scanned to give a comprehensive inventory. Further, RFID tag technologies have been contemplated in providing distributed inventory management between a manufacturer and a retailer. For example, a manufacturer may be alerted through the Internet each time a product is sold at a retailer using the information stored in the product's RFID tag. The manufacturer may then use this information to forecast replenishment schedules with the retailer to prevent an out of stock situation.

Although the above mentioned RFID tag developments help overcome some of the shortcomings of conventional perpetual inventory management systems, these developments lack the capabilities to provide real, or near real, time comprehensive inventory management in almost any point of a supply chain. Accordingly, there is a need to provide an intelligent inventory management system to provide a comprehensive view of the inventory within a particular environment.

SUMMARY OF THE INVENTION

Methods, systems, and articles of manufacture consistent with certain aspects related to the present invention provide a process for managing an inventory of items, each item being positioned in a respective location within an environment and being associated with a corresponding wireless identification device. In one aspect of the invention, the process may include providing item information associated with each item to each corresponding wireless identification device. Based on the item information, the process may perform an inventory management process to provide real time information associated with the inventory of items. The inventory management process may include at least one of an out of stock control process, a shrinkage recognition process, a rapid product recall process, an alert monitor process, and a sales optimization process. Each of these processes may perform various tasks that are used to manage the inventory of items in the environment, such as monitoring inventory levels of the items, detecting misplaced items in the environment, and providing feedback information associated with the items based on detected events (e.g., suggested alternative locations for certain items based on sales data).

Additional features of the invention will be set forth in part in the description which follows, and in part will be obvious from the description, or may be learned by practice of the invention.

BRIEF DESCRIPTION OF THE DRAWINGS

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention. In the drawings:

DETAILED DESCRIPTION

The following description of embodiments of this invention refers to the accompanying drawings. Where appropriate, the same reference numbers in different drawings refer to the same or similar elements.

Introduction

Systems and methods consistent with certain aspects related to the present invention enable an intelligent inventory management process to monitor and collect information associated with an inventory of items (e.g., products) included in an environment. An item, as the term is used herein, may be any type of product that is manufactured, developed, grown by a farm business, and provided by a manufacturer, business entity, individual, group of individuals, etc. For example, an item may be food (e.g., produce, dairy products, canned goods, etc.), an article of clothing, a plant or similar type of horticultural product, a machined part for an engine, sporting goods, etc. Further, an item may be associated with live animals or fish, such as livestock (e.g., cattle) that are raised by a livestock provider and sold to a livestock processing business. Alternatively, an item may be a domesticated or non-domesticated animal, such as a dog or reptile that is raised and/or maintained by an animal provider or caretaker (e.g., pet store, zoo, etc.).

The collected information may be used to perform various inventory management processes that enable a user to control the inventory of items, monitor shrinkage, facilitate and identify recalled or defective items included in the inventory, manage the misplacement of items within the environment, and receive alert messages associated with a variety of items inventory conditions, such as security conditions, out of stock conditions, etc.

In one aspect of the invention, an environment (e.g., retail store, etc.) uses a system of RFID-enabled structures, such as shelf units, to keep track of an inventory of items. Such a system is described in U.S. patent application Ser. No. 10/348,941, filed Jan. 9, 2003, which is hereby incorporated by reference in its entirety. Methods and systems consistent with certain aspects related to the present invention enable data associated with the items to be repeatedly collected by a data collection system. A user may operate a user interface that provides demand-based item information (i.e., when the user requests it) or exception-based item information (i.e., when something unusual or noteworthy occurs). Based on the collected data, an intelligent inventory management application and/or the user may manage out of stock items, monitor shrinkage, perform rapid recall functions, and send out alerts about noteworthy events.

System Architecture

Figure 1:
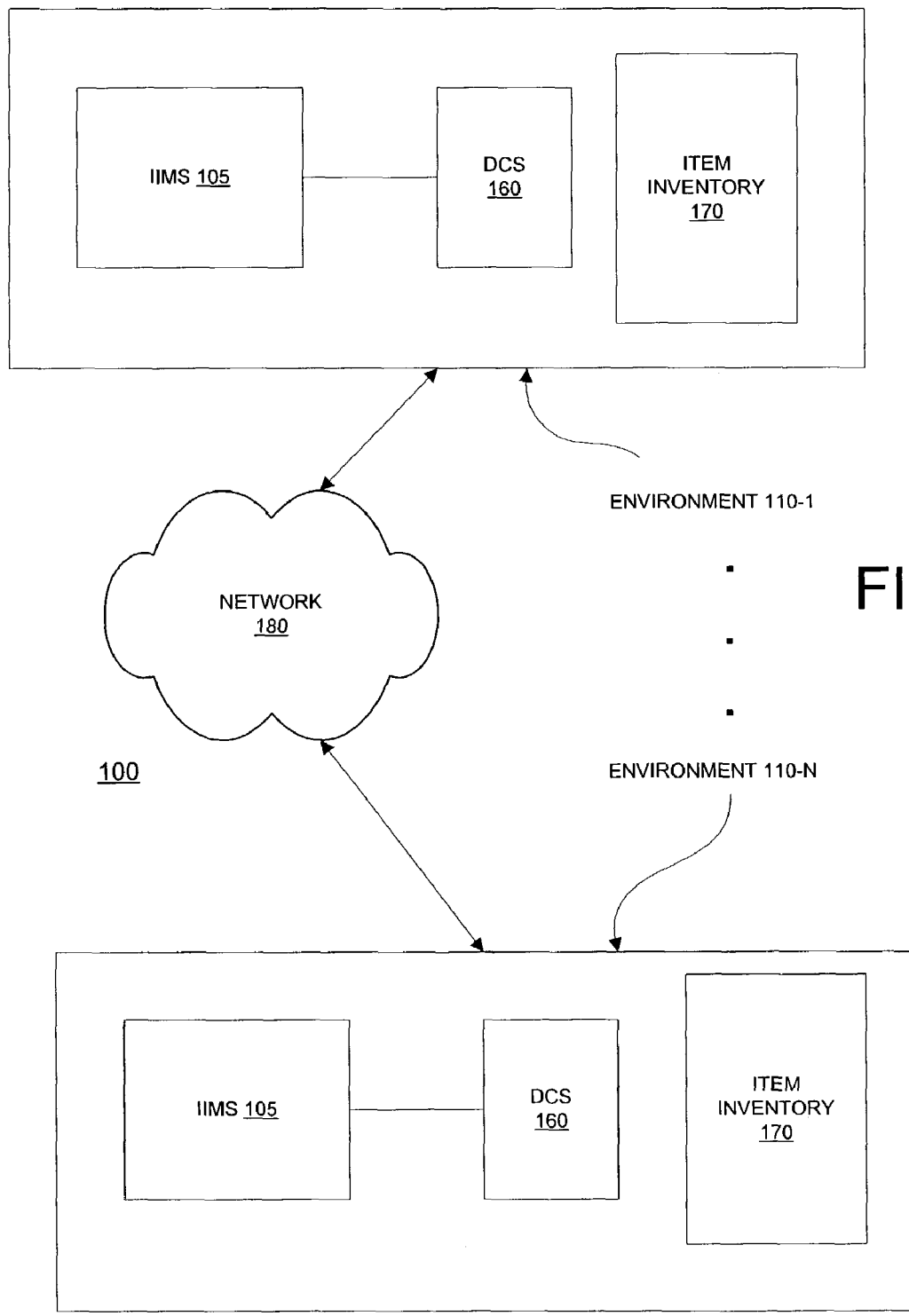
FIG. 1 is a block diagram of an exemplary system consistent with certain aspects related to the present invention.

FIG. 1 is a high level block diagram of an exemplary inventory management system 100 consistent with certain aspects related to the present invention. As shown, system 100 may include one or more environments 110-1 to 110-N interconnected by a network 180. Environments 110-1 to 110-N may also be directly connected via a direct communication path between the environments (not shown). Network 180 may represent any type of communication configuration that allows environments 110-1 to 110-N to exchange information. For example, network 180 may be a Local Area Network (LAN), a Wide Area Network (WAN), and a combination of networks, such as the Internet. Further, network 180 may include the infrastructure that allows environments 110-1 to 110-N to exchange information using wireless based communications.

Environments 110-1 to 110-N may each represent an environment associated with a business or non-business entity. In one aspect of the invention, each environment 110 may include, or is associated with, physical structures that manufacture, produce, maintain, store, and/or sell items. For example, environments 110-1 to 110-N may represent a retail store that sells items, a warehouse that purchases, stores, maintains, and/or ships items, a stock room that stores supplies, etc. Environments 110-1 to 110-N may also represent a main office business entity that manages the sale, production, storage, etc., of items located and sold in other environments 110. For instance, several environments (e.g., 110-1) may represent a retail outlet store, such as a supermarket, that sells items directly to consumers (i.e., users) and environment 110-N may represent a main office that manages the inventory and other business aspects of each of the several environments. In accordance with certain aspects of the present invention, one or more environments (e.g., 110-1) may perform intelligent inventory management based on item information collected by automated services performed within the environment(s).

To perform the intelligent inventory management services consistent with aspects related to the present invention, each environment 110-1 to 110-N may include an Intelligent Inventory Management System (IIMS) 105, a Data Collection System (DCS) 160, and item inventory 170. IIMS 105 may represent one or more computing systems, such as a server, personal computer, workstation, laptop, or any other similar computer system known in the art, that performs one or more processes consistent with certain aspects of the present invention. Although FIG. 1 shows IIMS 105 located within each environment, certain aspects of the invention enable the IIMS 105 to be located outside an environment as well. For instance, a department store chain may have several stores connected by a network to a single IIMS 105.

DCS 160 may be a configuration of hardware, firmware, and/or software that performs data collection functions consistent with certain aspects of the invention. In one aspect, DCS 160 includes components that collect item information from one or more items included in item inventory 170 using RFID technologies. Item inventory 170 may represent one or more items that are physically located within the respective environment 110. Item inventory 170 may also include one or more types of items that may or may not be similar in characteristics, size, price, taste, functionality, etc. For example, in the example that environment 110-1 represents a supermarket store, item inventory may include different types of food and beverages, with each type of item including a number of items. Thus, in the above example, environment 110-1 may include thousands of items of different types of beverages and other edible items. Alternatively, if environment 110-1 is associated with a home improvement warehouse retail store, item inventory 170 may include different types of tools, machines, appliances, etc.

For descriptive purposes in this application, the items described herein are associated with retail merchandise that is assumed to rest on store shelves that contain RFID antennae included in a respective environment 110. Each item may be associated with an RFID tag that includes item information associated with the respective item. For example, an RFID tag may include identification information unique to the item that the tag is attached, such as an a serial number or a price number. Alternatively, the RFID tag may include item information representing a type and/or associated characteristics of the item, and information identification an environment the RFID tag is located (e.g., for scenarios where IIMS 105 is located outside an environment). DCS 160 may be configured to retrieve the item information from RFID tags associated with each item included in item inventory 170 and provide the information to IIMS 105.

Other types of information retrieving mechanisms may be implemented within environment 110-1 associated with the antennae, including pegboard displays, garment racks, shelf-end displays, cabinets, kiosks, backroom or warehouse racks, display cases, and point of sale or checkout lane equipment. Further, although the following description of certain aspects of the invention involves RFID based shelf units, one skilled in the art will appreciate that the present invention can be applied as well with RFID readers associated with POS locations (e.g., checkout lanes), warehouse racks, portal areas, etc. The characteristics of the antennae (e.g., form factor), and the rate at which antennae are read, may require adjustment for use in applications other than shelves. For example, warehouse applications might require longer read range and less frequent data updates, while point of sale applications may require very fast data updates with possible lower read ranges. The type and functionality of the RFID based components and systems that may be implemented with methods and systems consistent with the present invention is described in the previously mentioned U.S. patent application Ser. No. 10/348,941, which is incorporated by reference in its entirety.

Exemplary Environment 110-1

Figure 2:
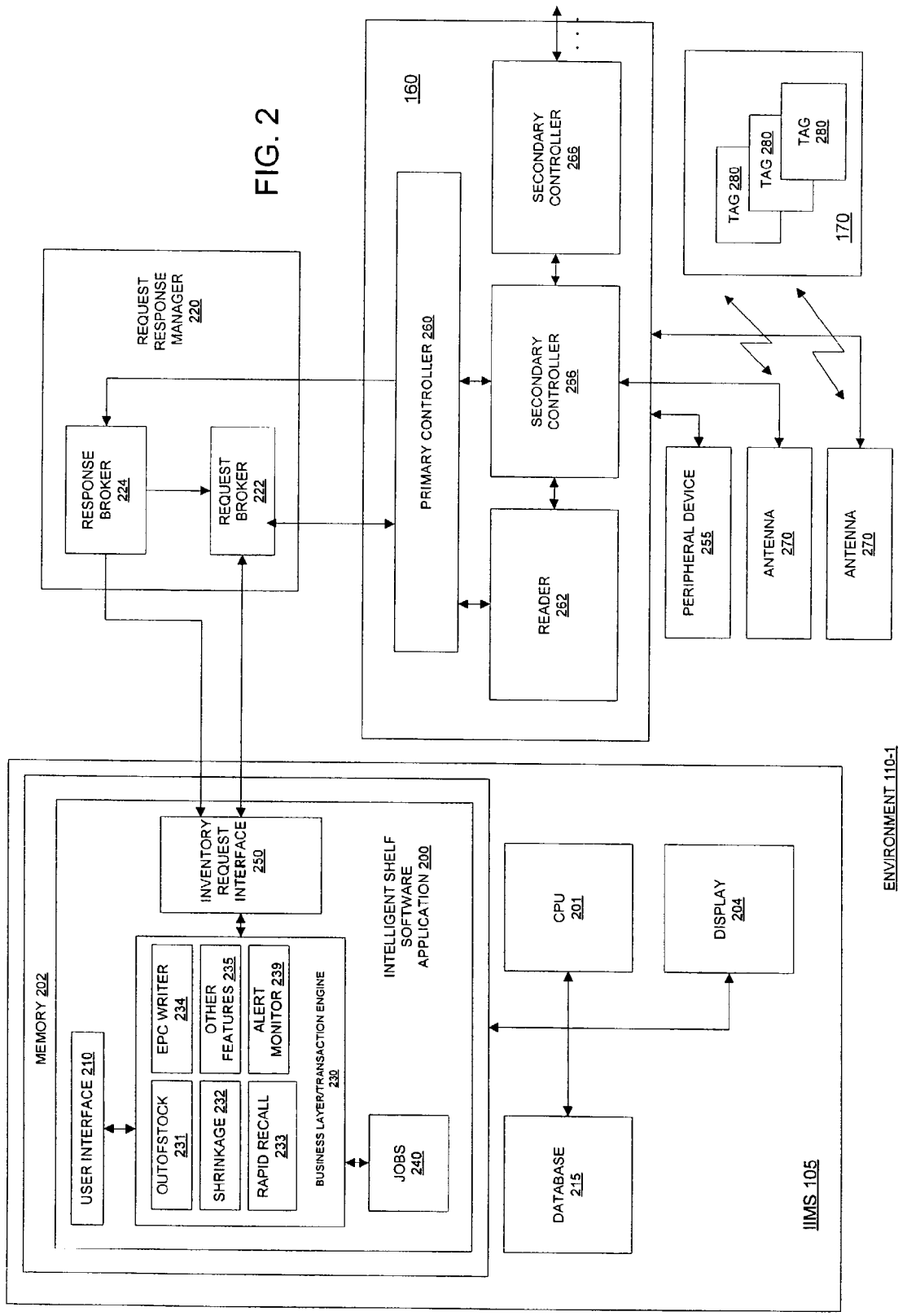
FIG. 2 is a block diagram of an exemplary environment consistent with certain aspects related to the present invention.

As described, system 100 allows item inventories 170 to be intelligently managed by one or more environments 110. FIG. 2 shows a block diagram of an exemplary environment 110-1 consistent with certain features of the present invention. As shown, environment 110-1 may include IIMS 105, a Request Response Manager (RRM) 220, and DCS 160.

IIMS 105 may include a CPU 201, memory 202, display 204, and database 215. CPU 201 may be any type of processor (or processors) known in the art. CPU 201 may be configured to execute instructions and perform processes consistent with certain principles related to the present invention. Although FIG. 2 shows only one CPU 201 included in IIMS 105, one skilled in the art would realize that a number of different architectures may be implemented by methods, systems, and articles of manufacture consistent with certain features related to the present invention. For example, CPU 201 may be replaced, or supplemented, by a plurality of processors with one or more of them performing multi-tasking and/or multiprocessing operations. Display 204 may be any type of device that presents information to a user, such as a computer screen in a workstation, laptop, dumb terminal, kiosk, etc.

Database 215 may be one or more storage device systems that store information used by IIMS 105 to perform the intelligent inventory management features consistent with the present invention. Database 215 may be controlled by a database server (not shown), such as an SQL database server. Further, a Java DataBase Connectivity (JDBC) driver for the SQL server may be used to access the SQL server database. Database 215 may store information associated with each identifier included in the RFID tags. Thus, for each Stock Keeping Unit (SKU) (i.e., information associated with an item reflecting at least a certain type of product (e.g., item type), made by a certain manufacturer, in a certain size, color, style, etc.), the item information stored in database 215 may be selected from:

1) A Universal Price Code (UPC) and/or an Electronic Price Code (EPC). Note that items made by a certain manufacturer in a certain size, color, etc. may have all the same UPC but each may have a unique EPC. Further description of EPCs is provided below with respect to the section entitled "EPC Writer."
2) A current price of the item.
3) An indicator of a seasonality of the item. A seasonality indicator may represent a relationship between an item and a period of time associated with different events or seasons, such as holidays, a time frame surrounding a certain date of a special event (e.g., the Super Bowl), etc. For example, a soap product may have a seasonality indicator representing no seasonal characteristics, such as "no season," wreaths may have a "Christmas" indicator, charcoal may have a "summer" indicator, etc. Further, promotional items (e.g., those items that are being specially marketed by a manufacturer or retailer) may have a seasonality indicator associated with a time frame, such as "July 2003," etc. The seasonality indicators may be used by ISSA 200 and/or a user to determine when to remove or restock certain items in item inventory 170.
4) A shelf life of the item. A shelf life may be a period of time that an item may be allowed to be included in item inventory 170. For example, perishable products, such as milk, may have a limited period of time that they may be presented on a shelf for sale to a customer. Non-perishable products may also have a limited period of time to be present in inventory 170 based on one or more factors, such as previous sales of items of a similar type, limited promotional time frames, etc.

5) Historical data about the sales rate of each type of item. The historical sales data may extend back a certain period of time, such as a certain number of days, hours, etc. The historical sales data may be formatted in such a manner that provides information reflecting a quantity of sold items of a given type over a period of time, such as a table including a column of sales data having 168 rows representing 7 days multiplied by 24 hours. The column may have fewer rows for an environment that operates less than 24 hours per day, such as a retail store or business that is not open round-the-clock. Further, database 215 may include additional columns of sales rate data for an item, for example representing certain conditions, such as a standard price, a promotional price, a holiday season, a clearance condition, etc. Holiday seasons may be extended (e.g., Christmas) or short (e.g., Memorial Day, July 4, Labor Day, etc.). Other situations that may produce unusual selling patterns (e.g., accelerated selling patterns) include the Super Bowl, or the days before predicted severe weather such as a blizzard or hurricane.

6) Historical out-of-stock data representing one or more conditions when a type of item has been unavailable in item inventory 170.

7) Historical data representing a number of times an item is picked up then returned to a shelf without a purchase.

8) A shelf "volume" size of an item representing a size characteristic of a single package unit of an item. The size characteristic may be measured as a rectilinear solid or other types of geometrical spaces that may be mathematically represented and manipulated by a process executed by a computer and/or user. For items that cannot be stacked on top of each other, the shelf volume size may be considered to extend up to another shelf positioned adjacent to the shelf whereon an item is currently located.

9) One or more locations within environment 110-1 where the item is preferably located, such as shelf numbers or warehouse locations.

10) Information summarizing shrinkage reflecting a movement of a certain number of items specific to time and place within environment 110-1. For example, shrinkage information may be associated with a condition where a large number of items of a certain type are removed from a shelf in a small amount of time.

11) Information summarizing out of stock events specific to time and place within environment 110-1.

Additionally, for an item collection of a certain type (e.g., an individual box of any type of item), database 215 may store item information selected from:

1) The EPC of the item.
2) The UPC of the item to relate back to the SKU information described above.
3) Other types of information not directly known from the SKU (e.g., color, style, size).
4) A serial number associated with the item (if other than the EPC).
5) A cost of the item to a business entity associated with environment 110-1, such as a retailer.
6) A date the item was first placed in a location within environment 110-1, such as a particular shelf.
7) An expiration date of the item (if any).
8) Item location information representing a current physical location of the item in environment 110-1 (or if sold, the last known location of the item).
9) A price an item sold was sold (if already sold).
10) A date the item was sold (if already sold).
11) A preferred customer number of a purchaser (if already sold) representing a unique number assigned to a user that purchases or may purchase items located within environment 110-1.

Database 215 may be configured to store data in various data formats and database configurations. For example, database 215 may store one or more tables that include information used by ISSA 200 to perform certain functions related to the present invention. These tables may include:

1) tblAlerts—a table that stores alerts and alert confirmations associated with certain events within environment 110-1.
2) tblCompany: a table that stores information about a business entity (e.g., company) that owns, leases, manages, and/or is associated with environment 110-1.
3) tblCurEPC—a table that stores information regarding current EPCs at a given location within environment 110-1 (e.g., at a given shelf).
4) tblEPC: a table that stores information relating an EPC code to product information, such as manufacturer, SKU, and other types of information associated with a product (e.g., an item).
5) tblEPCReader—a table that stores information that relates to an EPC reader device, such as reader 262.
6) tblEPCSkuBase—a table that stores information regarding a base level inventory for an EPC reader device (e.g., reader 262) and any item types associated with the reader.
7) tblERPInv—a table that stores information associated with a current theoretical inventory (e.g., a planned or proposed inventory that should be present in environment 110-1 as opposed to actual inventory) provided by an Enterprise Resource Planning system (ERP) or other types of inventory systems. An ERP system is a business management system that integrates many facets of a business, including planning, manufacturing, sales, and marketing, such as those ERP systems provided by SAP, Oracle, and PeopleSoft.
8) tblInventoryAlertConfig: a table that stores configuration items for an inventory alert job (e.g., a task performed by IIMS 105 that provides alert messages based on one or more inventory conditions).
9) tblInventoryRemovalAlertConfig: a table that stores configuration data for an Inventory Removal Alerts process.
10) tblManu—a table that stores information associated with one or more manufacturers of items included in inventory 170.
11) tblReaderType—a table that stores information that defines actions that an EPC reader may perform (e.g., read, turn displays on/off, adjust power level, etc.).
12) tblReaderTypeActions: a table that stores a list of possible actions for a given EPC reader.
13) tblRelatedEPC—a table that stores identification information for any EPC readers that are related to one of another (e.g., connected to a common shelf unit, associated with a common antenna or antennae, etc.).
14) tblRemEPC—a table that stores EPCs that are no longer located at a given location within environment 110-1 (e.g., no longer on a designated shelf).
15) tblRequestBroker—a table that stores information defining a request broker location and associated ports (e.g., TCP/IP port identifiers).
16) tblSku—a table that holds information about item SKU information.
17) tblSkuCat—a table that stores information regarding one or more categories for various items.

18) tblStore: a table that stores information about environment 110-1.
19) tblUser—a table storing a list of any users that are authorized to access ISSA 200.
20) tblVirtualCommands: a table that stores a list of virtual commands for an EPC reader. The command list may include commands that may be sent to an RFID reader to direct the RFID tag to perform one or more operations, such as storing item information.

One skilled in the art will appreciate that the above listed tables are exemplary and not intended to be limiting. Database 215 may include more or fewer tables that are configured to store various types of information used by ISSA 200.

Memory 202 may be one or more known type of storage devices that store data used by IIMS 105. Memory 202 may be, but is not limited to, a magnetic, semiconductor, and/or optical type storage device. Memory 202 may also be a storage device that allows CPU 201 quick access to data, such as a cache memory. In one configuration consistent with selected features related to the present invention, memory 202 may store data and/or program instructions (e.g., applications) to implement methods consistent with certain features related to the present invention. Among the software that may be included in memory 202 is Intelligent Shelf Software Application (ISSA) 200.

ISSA 200

ISSA 200 may be an application program, such as a web-enabled application, that provides information to a user, or to an ERP system. Accordingly, ISSA 200 may be configured to receive data from, and supply data to, a user or an ERP system (or other types of business management systems). ISSA 200 may temporarily store inventory data collected from DCS 160 in database 215 before transferring portions of the data to the user and/or an ERP system. In one aspect of the invention, a user may customize ISSA 200 to determine how much inventory data is managed and stored in database 215 and how inventory data is kept in an ISSA system located at another environment, such as environment 110-N.

Additionally, ISSA 200 may execute and/or operate with one or more security processes that are configured to control access to the functions of ISSA 200. For example, ISSA 200 may execute a security process that requires a user to provide a valid username and password (or other form of identification) to access the features provided by IIMS 105, including those performed by ISSA 200. Further, ISSA 200 may assign one or more roles to a user. Based on an assigned role, ISSA 200 (or any other application and/or process included in IIMS 105) may determine which tasks (e.g., programs executed by ISSA 200 via CPU 201) a corresponding user may access. Further, ISSA 200 may control whether a user is to receive certain types of alerts that may be received by ISSA 200 from other components within environment 110-1, such as DCS 160. Also, ISSA 200 may include a process that, when executed by CPU 201, creates and maintains a log file of any transactions performed by a user, such as adding data, requesting data, and/or modifying data in database 215.

ISSA 100 may include one or more user interfaces 210 that allow a user to exchange information with ISSA 200, such as through display 204. User interface 210 allows a user to request data in the form of commands or queries that are processed by business logic/transaction engine 230.

Business logic/transaction engine 230 may be software, when executed by CPU 201, manages one or more tasks (i.e., processes) consistent with certain features related to the present invention. In one aspect, these tasks may include an out of stock control task 231, shrinkage monitoring task 232, rapid recall task 233, EPC writer task 234, other features task 235, and alerts task 239.

Out of Stock Task 231

Out of stock control task 231 provides management functions to ISSA 200 associated with item inventory 170. For example, out of stock control task 231 may perform an inventory process that determines, on command and/or periodically, a physical inventory of items included in some or all of inventory 170, such as an actual inventory of items currently resting on a store shelf. Task 231 may allow a user (e.g., customer, employee, etc.) to request and view the results of the inventory process on a display device, such as peripheral device 255 or display 204. Task 231 may determine whether any item types are out of stock (e.g., not available for purchase by a customer because no items of that type are positioned in a location that the customer may collect and purchase). Task 231 may create a list of these out of stock item types and prioritize them based on or more factors, such as lost profits due to the item type being out of stock for a previous period of time (e.g., last month), lost profits due to the item type being out of stock at the time the out of stock condition was determined, availability elsewhere in environment 110-1 (e.g., in a back storage room), and sale term (e.g., a new release of a popular DVD, snow shovel sales during a blizzard, etc.).

Additionally, out of stock control task 231 may perform an item misplacement process that creates a log of any items that are positioned in an incorrect location within environment 110-1, such as when an item is placed on a wrong shelf. Further, task 231 may generate and/or forward a misplacement alert message when an item is determined to be misplaced. Also, task 231 may perform a shelf count threshold process that allows a user and/or ISSA 200 to receive and/or be alerted in the event of, an indication of any item types that have a shelf count below a threshold value for a given location. A shelf count represents a number of items of a certain type that are actually present in a given location associated with the item type. For example, in a supermarket, a certain shelf may be assigned to a type of item (e.g., canned soup). The shelf count of the exemplary item type would represent how many items of a particular type are located in the assigned shelf. In one aspect of the invention, the threshold value may be determined by a user and/or calculated by ISSA 200 based on one or more conditions, such as how many items of the certain type were previously removed from the given location during the same day, a week earlier, during the hours from a present time until the environment 110-1 is no longer open to customers, and/or until a next scheduled restocking of the item type. Also, the threshold value may be adjusted by one or more factors representing certain conditions associated with the item or external conditions, such as whether the item type is exposed to a sale promotion, a holiday shopping season, a time frame corresponding to a special event (e.g., the Super Bowl, weather conditions etc.).

In addition to providing feedback to ISSA 200 and/or a user regarding inventory conditions associated with one or more item types in inventory 170, out of stock control task 231 may also determine how much revenue (e.g., money) is being lost as a function of a certain period of time (e.g., lost revenue per hour) based on an item being out of stock (e.g., unavailable to a customer for purchase). Also, out of stock control task 231 may determine one or more factors that may influence the sale of items of a particular type. These factors may include, but are not limited to, pricing of the items of the item type, seasonal characteristics associated with the sale of the items, and sales of other types of items included in inventory 170.

Out of stock control task 231 may also determine one or more alternate locations within, and/or external to, environment 110-1 that a type of item may be repositioned based on previous sales associated with the item type and/or whether the item type is out of stock. Further, when an item type is determined to be out of stock, task 231 may generate a message to be displayed on a display device reflecting the out of stock condition. The out of stock message may also include other information, such as an apology for the out of stock condition, an offer for a discount of the sale price of another item of a type similar to the out of stock item type (e.g., store or generic brand product), a rain check for the out of stock item, and directions to an alternate environment (e.g., nearby store) that includes an item of the same type in its inventory and the item's price.

Shrinkage Task 232

Shrinkage task 232 may perform processes that manage the shrinkage of items included in inventory 170, such as the loss of inventory through theft, bookkeeping errors, and misplacement. In one aspect of the invention, shrinkage task 232 may perform a process that determines, and/or allows a user to receive information reflecting, when physical shelf inventory and/or theoretical shelf inventory are off by a certain percentage. Theoretical shelf inventory represents a value determined by ISSA 200 corresponding to an inventory of items that should be located in a particular location in environment 110-1. For example, in a case of high-value merchandise, a user may wish to know when the physical and theoretical inventory quantities are different by only one unit. Further, shrinkage task 232 may perform a process that determines, and/or allows a user to view, which locations of environment 110-1 are experiencing the greatest shrinkage. Also, task 232 may perform a process that determines, and/or allows a user to view or be alerted, when items are removed from the shelf in a predetermined quantity, such as a quantity defined by a store manager. The predetermined quantity may represent a large quantity of items that are removed in a relatively short time, which may possibly indicate a theft condition. The removal of a large quantity of items, however, may also denote an exceptionally good customer deserving immediate customer service. Accordingly, shrinkage task 232 may record a detected shrinkage condition in a log and may send an interrupt signal to one or more peripheral devices, such as silent alarms, flashing lights over a gondola, a camera or video time stamp, or an audio "thank you message." Further, shrinkage task 232 may create and provide a message to a user (e.g., sales clerk, employee of environment 110-1, etc.) that includes information to dispatch the user to the area to offer assistance to a "valued customer."

Rapid Recall Task 233

Rapid recall task 233 may perform one or more processes that allow a user or business entity (e.g., retailer, item manufacturer, etc.) to trace items based on critical data, such as lot number, age, etc. Task 233 may determine and provide information about an item or items that may need to be removed from a shelf, or whose sales should be accelerated for other reasons. For example, certain types of items may have an associated expiration date determined by their manufacture, such as pharmaceuticals, health and beauty products, and perishable goods (e.g., foodstuffs). Although some of these items may still be safe (and pharmaceuticals still be effective) for some time beyond the expiration date, accepted practice may be not to sell the items after their expiration date. Therefore, shrinkage task 233 may identify items that are approaching an expiration date and provide information to a user that indicate the expiration date condition. Further, task 233 may provide suggestions to promote the sale of these items before their expiration date, such as determining an alternate location in, or outside, environment 110-1 that has a history of higher item sales (e.g., a front of a shelf), and/or suggestions to sell the items at lower prices.

Also, task 233 may provide information to a user when an item or items have expired so that the items may be removed from inventory 170. Rapid recall task 233 may also provide information associated with purchase planning for item types. For example, an item type that is not selling well (e.g., sales of the item are not reaching expected levels) before its corresponding expiration date may be indicative of excess inventory. Accordingly, task 233 may provide information that reflects a relationship between previous sales of an item type and expiration dates for items of that item type.

Additionally, rapid recall task 233 may access database 215 to collect shelf life information associated with each item in inventory 170. Shelf life information may represent an approximate useful life of an item, which may be determined from an expiration date for certain types of items. Alternatively, shelf life may represent a usual turnover time for the item, regardless of its useful life or expiration date. Task 233 may determine when an item has exceeded its shelf life and provide an indication of this condition to a user, via a display device (e.g., display 204).

Rapid recall task 233 may also access database 215 to collect time-stamped temperature data associated with certain items in inventory 170. The temperature data may reflect a temperature value of an area proximate to a one or more items stored in environment 110-1, such as a refrigerated shelf unit. Rapid recall task 233 may use the temperature data to calculate a reduced shelf life or predict spoilage for temperature dependent items, such as milk. Further, task 233 may provide and/or forward an alert message to a user that reflects a condition when the temperature of a particular area (e.g., refrigerated shelf unit) falls below an acceptable level for any items stored in the area.

Further, for any items of certain types that have a shelf life or expiration date, rapid recall task 233 may provide, as an additional safety feature against database error, an alert to one or more locations within or external to environment 110-1. For example, an alert message (e.g., sound and/or display message) may be provided at a POS location or checkout lane to have the cashier double-check the expiration date normally printed on the package for an item about to be purchased at the POS location.

Rapid recall task 233 may also determine which items have been modified by a manufacturer or supplier and, based on this determination, provide information reflecting possible actions that may help move older inventory. For example, products (i.e., items) sometimes undergo a style change, such as a new package style, a different size, a color change, a flavor change, etc. While the existing product is still good, a retailer may want to sell off existing older stock as soon as possible because customers may be reluctant to purchase a perceivably older product. Accordingly, rapid recall task 233 allows the retailer to locate such restyled merchandise and to move it to more marketable locations, such as onto the sales floor, in the front of shelves, and/or offer the merchandise at a discounted price to move the older merchandise from inventory 170.

Items also may be defective when they arrive in environment 110-1. In the case of pharmaceuticals, it may be imperative to remove the item immediately to prevent possible health risks. These items may be destroyed at environment 110-1 or returned to the manufacturer. Further, a defective item may need to be recalled by the manufacturer. Accordingly, removing the defective item from inventory 170 before it is purchased may save time for a retailer and the customer, as well as permit the item to be returned to the manufacturer intact in its original package. Rapid recall task 233 may perform one or more processes that address these types of situations. For example, in some cases, an item may have a defect that renders it less valuable, while not constituting a health or safety risk, such as an item with a missing part, a cosmetic defect, a mismatched part, etc. A manufacturer may be able to identify these items after they have been delivered to environment 110-1 based on an identification number associated with the delivery (e.g., lot numbers). However, once a large number of items are warehoused and/or shipped, different lots may become mixed together and the retailer may have problems identifying the items affected without opening the packages. However, with the RFID tagging features associated with certain aspects of the present invention, the manufacturer may identify a range of RFID serial numbers that were incorrectly packaged. Environment 110-1 may receive these serial numbers and allow ISSA 200 to identify the defective items in inventory 170. Rapid recall task 233 may perform a process that searches database 215 for items associated with the received serial numbers for the defective items and provide this information to a user, perhaps through display 204 or other peripheral devices. The user may then offer customers various marketing incentives to move the defective items from inventory 170. For example, a customer may be offered a discount on a defective item for purchasing it "as-is." Upon sale of the product, a cashier may either take the customer's name and address and relay this information to the manufacturer, or the customer may be given a key number with which to order a missing part free of charge from the manufacturer, such as through the Internet. Alternately the known missing part may be shipped to the retailer to be handed out as a free "service package." Procedures like these would save the manufacturer shipping and handling costs involved in returning the entire package. Further, a retailer might even use this feature to offer a special discount to a customer willing to purchase an "open carton" or such as product returned by another customer, that may lack items not due to manufacturer's fault. Using the RFID tagged items, a retailer may offer a special discount on packages damaged in the retailer's inventory 170, without worrying that unscrupulous customers might damage good boxes on the shelf and seek to obtain a discount.

Additionally, certain types of items, such as software products, often contain known errors or "bugs," that may require a remedial "corrective patch." For example, a computer readable medium (e.g., CD-ROM, DVD, magnetic disk, etc.) including one or more programs and data may require a revision comprising only a few megabytes that can be downloaded over the Internet. Rapid recall task 233 may identify these types of defective items using the RFID tags 280 in inventory 170. Consequently, the retailer and/or manufacturer may offer a customer a small discount to purchase an "out-of-date" or "buggy" product, with the customer understanding that the product may be brought up to specification with a few minutes' time on the Internet to download the corrective code. Further, environment 110-1 may provide one or more workstations that a user may use to download the corrective code while in environment 110-1.

EPC Writer 234

EPC writer 234 may be a process that is used to aid ISSA 200 write EPCs to particular RFID tags 280. In one aspect of the invention, EPC writer 234 may access database 215 to obtain identification numbers, such as a UPC, for particular items that are to be tagged with an EPC on an RFID tag 280. Further description of these aspects of the invention is described below with respect to the section, EPC Writer.

Other Features Task 235

Other features task 235 may perform one or more applications associated with advertising, price sensitivity, sales optimization, automatic pricing, and customer information and services.

In one aspect of the invention, other features task 235 includes an Advertising, Price Sensitivity, and Sales Optimization (APSSO) application that determines relationships reflecting how advertising (e.g., marketing and/or presentment of items) and/or price influences the sales or possible sales of items or item types that are presented to customers that interact with inventory 170. This application may create, on demand or periodically, a summary of how often an item or items of a certain type are physically moved from their current location in environment 110-1, such as when an item is taken off of a shelf and replaced. Thus, the APSSO application may request and receive periodic inventory updates of inventory data reflecting a current inventory of items in inventory 170. The APSSO application may leverage the out of stock task 231 to collect the inventory information, or alternatively send commands to inventory request interface 250 to collect the information itself, such as requesting an inventory reading a shelfs contents at least every few seconds. The APSSO application may compare the collected inventory information to sale rate data associated with the items corresponding to the collected inventory information to provide an indication (e.g., a ratio) of a number of item examination events per single purchase event. The indication, or ratio, may describe how much attention an item is getting from customers, as opposed to the rate of item purchases. The data could be correlated with location information associated with the item, for instance, whether the item was at eye level, on a shelf-end display, positioned in the front of a store, positioned in a promotional display, positioned in the back of the store, etc.

The term eye level, as used herein, may refer to one or more distances extending from the floor of environment 110-1 where items are displayed for purchase, such as 5 feet to 7 feet high. One skilled in the art will appreciate that the term eye level is not intended to be limited by this exemplary range of distances. Any distance from the bottom of a structure that supports item(s) that rests on the floor of environment 110-1 may be associated with the term eye level without departing from the scope of the invention. Further, the distance associated with the term eye level may be based on the type of environment 110-1 represents. For example, a clothing manufacturer and/or retailer may determine that eye level refers to a distance lower than that of a distance defined by a food retailer.

Also, the APSSO application may determine how often an item is purchased in pairs, triples, etc. Further, for a given item type, the APSSO application may identify other items of other types that are moved from their current position in environment 110-1 at, or about (e.g., within a few seconds, minutes, etc.), the same time as the given item type has an item moved, known as a correlated time of purchase. The APSSO application may also determine which items of a given type, if any, have not moved from their respective positions for a defined time period. Alternatively, or additionally, the APSSO application may determine what items of a given type have been moved and replaced for a defined time period (i.e., items that are not being purchased by the customers). And, the APSSO application may identify any items of a given type that have undergone a price change within a previous period of time, such as the past day, week, month, etc.

The APSSO application may generate a list of these price changed items and provide the list to a user via a peripheral device (e.g., device 255) and/or display 204. Further, the APSSO application may determine, based on the identified items with price changes, a relationship between these items and the number of item examination events (e.g., when a customer picks up an item and replaces it).

In one aspect of the invention, the APSSO application may interact with an expert system (internal or external to IIMS 105) to analyze historical data on cross-item or correlated sales, sales velocity (i.e., how rapidly or slowly are items being sold and their respective inventory being depleted), price-sales sensitivity (e.g., a relationship between previous sales of an item type and sale price events for that item type), seasonality, etc., to suggest improvements in store layout and shelf organization. That is, the expert system and/or the APSSO application may determine and provide suggestions to a user via a peripheral device on alternative locations for certain item types based on the above analyzed information.

Other features task 235 may also include an Automatic Pricing Application (APP) that performs processes that manage the sale price of an item. In one aspect of the invention, the APP may receive and/or collect price plans from database 215 (or any other memory device that may store these plans) and automatically update a displayed item sale price on a display device (e.g., an LCD mounted on a shelf supporting the item). A price plan may represent a price schedule for certain or all item types in inventory 170 that is generated by a price plan process executed by a computing device (e.g., IIMS 105) or generated by a user (e.g., retail store manager). For example, an exemplary price plan may include scheduled promotions that suggest reducing the price of certain item types based on these promotions. Further, a price plan may consider season or time dependent conditions, such as holidays, weather conditions, etc., to determine how to modify the price of an item type. For instance, the price plan process may collect periodic weather information from a server system that accesses and stores current weather data for a surrounding area proximate to environment 110-1 (e.g., 50-100 mile radius, city limits, etc.) The price plan may use the collected weather information to determine whether the sale price of certain items (e.g., snow shovels, stock wood studs, etc.) should be adjusted. Alternatively, a user (e.g., store manager) may collect, or automatically receive, the weather information and adjust the sales price manually through the price plan process and/or the APP.

The APP may also correlate, in real time, the price of a target item with the age of the shelf inventory associated with the target item, an amount of items of the same type as the target item in theoretical inventory, and the sales velocity of other item types whose sales correlate with the sale of the target item. The APP may generate a report reflecting the correlation(s) and provide the report on demand or on a scheduled basis to a peripheral device (e.g., storage device, display device, printer, etc.).

The other features task 235 may also include a Customer Information and Special Services Application (CISSA) that performs processes that provide users (e.g., customers shopping in environment 110-1) with assistance in locating an item of interest under a variety of special circumstances. In one aspect of the invention, the CISSA may also provide item inventory availability information to remote users (i.e., customers). For example, a user remotely located from environment 110-1 may access a web site hosted by a server operated in association with environment 110-1 through network 180. Using the web site, the user may request the availability of one or more items of one or more types at environment 110-1 (e.g., is an item in inventory 170). The CISSA may receive the request from the computer server and determine whether the request items are available in inventory 170. In one aspect of the invention, the CISSA may access database 215 to collect inventory information collected by out of stock task 231. Alternatively, or additionally, the CISSA may request a search for the requested items throughout environment 110-1 by providing one or more commands to RRM 220 and DCS 160.

Further, the CISSA may generate a request for the availability of the requested items at one or more remote environments (e.g., environment 110-N) and receive back a response indicating whether the requested item(s) are available at these respective locations. In this scenario, the remote environment may perform a local inventory search process to determine whether the item is currently in stock. Based on the local search, the remote environment may provide a response message to environment 110-1 indicating the result of the local search (e.g., the item is or is not available at that location). Alternatively, remote environments may periodically provide their current inventory data to environment 110-1. ISSA 200 may receive and store this received information in a database (e.g., database 215) for access by the CISSA as needed.

Based on the received information indicating whether the item is available, the CISSA may provide the user (via the computer server and network 180) a response indicating a real-time availability of a requested item at environment 110-1 and/or at alternate environments, such as a user's favorite retail outlet or the nearest three or four alternative outlets.

Additionally, the CISSA may provide the same item availability functions described above through computing devices located within environment 110-1 (e.g., kiosks located in a store). For example, when a customer arrives at a store (e.g., environment 110-1) expecting to find a particular item and is disappointed to learn the item is out of stock, the customer may request the item's availability using a kiosk located within the store. In addition to one or more alternative store addresses that have the item in stock, the kiosk may display to the customer an offer for an inconvenience discount (e.g., a cents off coupon for the item or perhaps another item). The customer may accept the discount by, for example, providing a simple code word/number of their choice. The discount will be valid for a limited period of time and the customer need only use the chosen word/number within 24 or 48 hours this code word/number will entitle them to the discount at the alternative stores. Further, the CISSA may also provide alternate location information on a display device mounted on a shelf unit supporting an item or group of items. For example, for any item that is not in stock, the display device may display the location of, and/or directions to, the nearest alternate location (e.g., store) that currently includes the item in inventory. For items which are not out-of-stock, the display device may show the item price instead of alternate locations. As described above, the alternate locations may be determined based on these locations performing, on a periodic or a demand basis, an inventory search for the requested item.

Alert Monitor 239

Alert Monitor 239 may perform one or more processes that notify a user of certain events. In one aspect of the invention, alert monitor 239 may notify a user through e-mail, a pager, a cell phone, an audible or visual signal, etc. Alert monitor 239 may include the appropriate software to interact with other devices, software, and/or computing systems that include the infrastructure to facilitate communications over a particular medium. That is, alert monitor 239 may send an alert message to an output interface that translates the message into a format compatible with a message relaying or provisioning system (e.g., wireless network device, etc.). Alert monitor 239 may receive data reflecting an event from interface 250 and/or other processes, such as one of tasks 231-234, and formulate an alert message accordingly. The received data may reflect a pending item known to be in an alternate location (e.g., back room) so that a user (e.g., retailer employee) may bring the spare stock onto a retail floor. If the item out of stock cannot be replenished from the alternate location, the user and/or ISSA 200 may reorder the item. Further, the received data may reflect a malfunction in one or more components within environment 110-1, such as an antenna 270.

In one aspect of the invention, alert monitor 239 may operate on an "exception" basis. That is, providing alert messages as an event is detected to indicate to a user when something unusual happened. Also, alert monitor 239 may operate on an escalation basis, where repeated or prolonged events would be given a higher priority. For example, a stock clerk might be alerted whenever an item was approaching an out of stock situation, or when a single shelf malfunctioned. Further, a department manager might be alerted if several types of items were out of stock, if an out of stock situation persisted for more than a day, and if a gondola went out of service.

ISSA 200 may also include one or more inventory request interfaces 250 that collects RFID tag reader events and may receive data and/or requests from business layer 230 and request response manager 220. The exchange of commands, data, and/or information within environment 110-1 denote a typical information flow, which may be associated with a higher level entity, such as inventory request interface 250 sending a command to a lower level entity such as DCS 160, and in return, receiving data from the DCS 160. Further, the information flow may also be reversed. For example, DCS 160 may request information from ISSA 200, such as antenna tuning data, or may report certain events ISSA 200, such as a malfunction in one or more components (e.g., antenna 270). Interface 250 may be an Active Server Page (ASP) that other applications may send HTTP information. Interface 250 may receive EPC data from RRM 220 and send EPC eXtensible Markup Language (XML) data to a message queue that is set up for each reader 262 in DCS 160.

ISSA 200 may be configured using different types of architectures. For example, in one aspect of the invention, ISSA 200 may be configured in a three-tier architecture structure that includes a top level associated with user interface 210, a middle layer associated with business logic/transaction 230, and a bottom layer associated with database 215.

The top layer user Interface 210 may be software that runs on a web browser, such as Internet Explorer (v5.0 or higher) from Microsoft® Corp. User interface 210 may, when executed by CPU 201, send requests and receive responses from a computer system, such as a server (e.g., Microsoft® Internet Information Server (IIS)). The server may return XML and eXtensible Stylesheet Language (XSL) information to user interface 210. The XML and XSL information may be applied together by user interface 210 using one of many Document Object Model (DOM) techniques (e.g., Microsoft DOM). When the XML and XSL are applied by user interface 210, content presented in Hypertext Markup Language (HTML) may be displayed on display 204 through the browser executed by IIMS 105. Although the above examples described XML and HTML based services, one skilled in the art will appreciate that many types of data processing and presentation languages may be implemented without departing from the scope of the invention.

The middle or Business Logic tier 230 exposes business logic to ISSA 200. Business logic components may be developed, for example, using Microsoft .NET Classes, Microsoft VB.NET or C#. Furthermore, .NET Class components may be created from within ASP.NET Web Services. These classes may be stateless, and multi-threaded unless otherwise specified by business logic 230.

The database 215 tier may store data used to perform one or more inventory management processes consistent with certain features of the invention. In one aspect of the invention, there may be no business logic in this tier, that enables IIMS 105 to implement multiple types of databases. Database 215 may be accessed using different types of database languages, depending on the architecture the database is configured upon. For example, Structured Query Language (SQL) commands via ActiveX Data Objects (ADO) and/or Open DataBase Connectivity (ODBC) over Transmission Control Protocol/Internet Protocol (TCP/IP). Further, to prevent mismanagement of the information, database 215 tier may be configured to allow access only by business logic tier 230.

RRM 220

RRM 220 may be an application that is executed by a computing system (e.g., an RRM system (not shown)) to provide a bridge (i.e., interface) between high level components (e.g., software such as ISSA 200) and lower level components (e.g., hardware/firmware, such as DCS 160). Although FIG. 2 shows RRM 220 as a separate component, RRM 220 may be stored in memory 202 and executed by CPU 201. In one aspect of the invention, RRM 220 may communicate between inventory request interface 250 and one or more primary controllers 260, located in DCS 160, or primary controller proxies (not shown) located within RRM 220, which perform data handling or analysis on information collected from RFID tags 280 in inventory 170. RRM 220 may include a user interface that allows a user to view a current status of RRM 220. The user interface may be accessed from IIMS 105 which may execute RRM 220.

In one aspect of the invention, RRM 220 may load XML configuration documents from an RRM configuration interface (not shown) included in ISSA 200. The configuration file may include one or more event lists and/or command lists, which are a list of events provided by DCS 160 and commands provided by ISSA 200, respectively. RRM 220 may create a request broker 222 for each event list in the configuration file from a configuration XML document provided by ISSA 200 (e.g., inventory request interface 250). Alternatively, RRM 220 may create a primary controller proxy (not shown) for each event list. A primary controller proxy is further explained below with respect to DCS 160 and primary controller 260. Also, RRM 220 may create one or more response brokers 224 that handle responses from one or more primary controllers 260 or primary controller proxies included within RRM 220. A response broker 224 may also send acknowledgment and/or failure information to request broker 222 indicating whether a response has been properly received from primary controller 260. In one aspect of the invention, response broker 224 may initiate an object-oriented class based on a reader 262 that receives read data and converts it to an EPC XML document. Response broker 224 may also send the EPC XML document to ISSA 200, if available. If the ISSA 200 is not available at that time, response broker 224 may store the EPC XML document in a queue until ISSA 200 is available.

When request broker 222 is initiated by RRM 220, it may be sent a list of commands from ISSA 200. Request broker 222 may access the received list and execute each command. After each command is executed, request broker 222 may wait for a response from a response broker 224, such as acknowledgement or failure response. If there is no response from response broker 224 within a certain time period (that may be defined in the command list), or a failure message is returned, another command list may executed in response to the failure. On the other hand, if an acknowledgement is received from response broker 224, then request broker 222 may execute the next command in the command list. Once all commands in a command list are executed, request broker 222 may re-execute the commands in the command list in the original order of execution.

Response broker 224 monitors for any responses provided by primary controller 260 or a primary controller proxy included within RRM 220. When a response arrives, response broker 224 may determine a response Internet Protocol (IP) address and creates a thread to process the received response while continuing to monitor for any additional incoming responses. Based on a received response from primary controller 260, response broker 224 may provide an appropriate request broker 222 with an acknowledgment or failure information representing the status of the broker's request. The appropriate response broker 222 may be the broker that executed a command or request that corresponds to the received response.

In the event the received response contains data, response broker 224 may dynamically initiate a method of an object to parse the data based on the configuration XML. Each class that is initiated may return similar EPC XML data. Response broker 224 may place each returned EPC XML data into a data structure, such as a table. Response broker 224 may also retrieve one or more read sequences for a given reader 262 from the table (e.g., a sequence of read commands that retrieve EPC information from certain RFID tags 280).

If response broker 224 determines that there is EPC XML data left in the queue for a current reader 262, then response broker 264 may send the data to ISSA 200. In one aspect of the invention, response broker 224 may send the EPC XML data from the queue in a particular sequence, such as oldest to newest. Once the queued EPC XML data is provided to ISSA 200, response broker 224 may then send the current EPC XML received. On the other hand, if there is no EPC XML data in the queue for the current reader 262, then the current EPC XML data is passed to the ISSA 200. At that time, if ISSA 200 is unavailable, then response broker 224 may place the current EPC XML in the queue.

In one aspect of the invention, ISSA 200 may request data (e.g., provide a read command) on demand (e.g., requests with response times of a few seconds or less) or periodically, such as requests that are initiated automatically on set schedules (e.g., every minute, hour, day, etc.). DCS 160 may acquire the requested data from RFID tags 280 through one or more antenna 270. The rate of acquisition of the data may be based on the number of RFID tags 280 included in inventory 170. Thus, for example, DCS 160 may collect the requested data within a few seconds for an inventory including a few hundred of tagged items or within a few minutes for much larger inventories, such as those including thousands of RFID tagged items. It is the responsibility of RRM 220 to manage the collection of the data through the components operating within DCS 160. For example, RRM 220 may be configured to sequentially provide a query for requested data to several RFID tag reader devices (e.g., reader 262) that are dedicated to collecting item information from RFID tags positioned in different locations within environment 170.

DCS 160 and RFID Tag Data Collection

DCS 160 may be a collection of hardware, firmware, and/or software that perform data collection functions consistent with certain aspects related to the present invention. DCS 160 may include a primary controller 260, one or more readers 262, and one or more secondary controllers 266. DCS 160 may control one or more antenna 270 that are associated with (e.g., mounted on) corresponding support structures (e.g., shelf units) from which one or more items rest. The items in inventory 170 may each be tagged with RFID tags 280 that include item information, such as an EPC reflecting various characteristics associated with the respective item. When a corresponding antenna 270 is activated by DCS 160, information within any RFID tags 280 located within a readable proximity of the activated antenna may be retrieved and provided to DCS 160. The RFID tags 280 respond to RF energy emitted by antenna 270, and this response is sensed by reader 262, which returns digital serial data to the primary controller 260. The digital serial data may be parsed by primary controller 260 and then returned to response broker 224 for further processing by ISSA 200.

Primary controller 260 may be a device and/or process that monitors for and receives requests (e.g., commands) from request broker 222 and consequently generates a series of corresponding commands specific to a reader 262 that environment 110-1 may be using to access particular items in inventory 170. In one aspect of the invention, the commands provided by a request broker 222 may be formatted in accordance with a network protocol, for example, the TCP/IP protocol. Primary controller 260 may send the received commands (e.g., TCP/IP packets) to reader 262 and/or one or more secondary controllers 266. In another aspect of the invention, controller 260 may pass the commands to reader 262 and/or one or more secondary controllers 266 in the form of RS-485 or other types of serial communication protocols. Table I shows a list of exemplary commands that primary controller 260 may provide to reader 262 and/or secondary controllers 266.

TABLE I

Exemplary Primary Controller Commands
EXEMPLARY COMMAND

Select an antenna 270
Place reader 262 in active mode
Adjust a power level of reader 262 for the selected antenna 270
Perform a first read operation
Determine which EPC numbers have been read
Prevent the read tag(s) from responding further during a current read cycle
Perform additional read operations until no more EPC numbers are read
Place reader 262 in standby mode
De-setect the antenna 270
Continue with the next antenna 270 to be read Primary controller 260 also monitors for a response from reader 262 and/or secondary controller 266 that was sent one or more commands. Based on whether a response is received and the type of response, primary controller 260 may generate and send acknowledgment, non-acknowledgment (e.g., failure), and/or read information to response broker 224. The read information may include EPC information associated with the RFID tags 280 in inventory 170. For example, primary controller 260 may provide one or more EPC numbers to response broker 224 each time a read operation is completed by reader 262. Alternatively, primary controller 260 may store the EPC numbers temporarily in a memory device (not shown). Once a certain number of RFID tags 280 for one or more antennae 270 have been read by reader 262 (e.g., all of tags, a portion of the tags, etc.), primary controller 260 may also perform a batch transfer process that provides the read data (e.g., EPC data) all at once, or in groups, to response broker 224.

In another aspect of the invention, primary controller 260 may adjust for any differences in a received command or data stream that may be peculiar to a reader 262 that the controller may use to read information from RFID tags 280. Primary controller 260 may use any of a number of readers 262 so long as the chosen reader 262 is physically able to drive one or more antennae 270. Each antenna 270 may be configured to be compatible with one or more different types of readers 262. In one aspect of the invention, a given antenna 270 may be optimized (i.e., tuned) for one frequency, so that the antenna 270 may work with any reader 262 that uses the same frequency. Accordingly, more than one reader 262 may activate any given antenna 270 within environment 110-1 as long as the reader 262 provides its signals using the frequency tuned to that given antenna 270.

As explained above, although FIG. 2 shows primary controller 260 as part of DCS 160, controller 260 may be implemented as a software primary controller proxy (not shown) within the RRM 220. Accordingly, communications from the primary controller proxy software may leave the RRM 220 as TCP/IP commands and are converted to RS-485 data communications by a separate device and/or process (not shown).

Reader 262 may be one or more of any type of off-the-shelf RFID readers provided by many different manufacturers, such as the I-CODE reader provided by Philips®. More than one type of reader 262 may be implemented within DCS 160, as long as primary controller 260 (or an equivalent device dedicated to communicate with reader 262) is configured to communicate with the reader 262 (e.g., provide valid commands and properly interpreting returned data). Although FIG. 2 shows reader 262 as a separate component within DCS 160, primary controller 260 and reader 262 may be physically combined in a single electronic entity. Depending on the type of environment 110-1 and/or item inventory 170, one, several, several hundred, etc. readers 262 may be used by DCS 160 to collect item information from inventory 170. Although each reader 262 may be associated with its own primary controller 260, a single primary controller 260 may be assigned to work with one or more readers 262 to facilitate collecting item information from inventory 170.

Secondary Controller 266

Besides communicating with reader 262, primary controller 260 also communicates with one or more secondary controllers 266. Secondary controller 266 is a computing device and/or process that may select one or more antennae 270 by controlling electronic components that act as switches to activate or deactivate a corresponding antenna 270. Each secondary controller 266 may be physically located proximate to and connected with a group of antennae 270, such as several antennae contained within a shelf or localized fixture that store items included in inventory 170. For example, environment 110-1 may have hundreds of secondary controllers 266 and thousands of antennae 270. Further, secondary controller 266 may also, upon receiving one or more commands from primary controller 260, operate a peripheral device 255 to display item information from RFID tags 280 included in item inventory 170 and/or provide inventory information to a user. For example, peripheral device 255 may be a display mounted on a front edge of a shelf that supports one or more items. Alternately, peripheral device 255 may be connected directly to a serial data bus that communicates between primary controller 260 and secondary controller 266. Further, peripheral device 255 may be connected to a dedicated bus that is not tied to secondary controllers 266 (e.g., USB). Besides output devices such as displays, peripheral device 255 may include an input/output device, such as a bar code reader or any other type of device that may plug into a shelf to facilitate data collection/retrieval from items with or without RFID tags 280. For example, a user may use such a bar code scanner to collect and read the UPC number for an item and to associate an EPC number with UPC numbers already in a database. Accordingly, in circumstances where one or more items are received by environment 110-1 without an RFID tag 280, the scanner may be used to facilitate associating a non-tagged item with a UPC or EPC. Also, peripheral device 255 may be a monitoring device that connects to an interface mounted on a shelf unit. The monitoring device may perform checking functions, such as checking the status of any antennae in the shelf unit and items resting on the shelf.

In one aspect of the invention, one or more peripheral devices 255 may communicate with one or more secondary controllers 266. For example, peripheral device 255 may represent a plurality of proximity sensors that each detect the presence of a user (e.g., customer) within a predetermined vicinity of the device 255. Based on whether a user, or other entity, was within the vicinity (e.g., a few inches, a few feet, etc.), device 255 may generate a signal (e.g., analog or discrete signal, digital signal, etc.) that may be monitored by a processor device and/or computer executed process with analog and/or digital I/O processing capabilities. Alternatively, device 255 may be a video camera mounted within or proximate to one or more shelves for surveillance purposes. The camera may receive a signal (e.g., interrupt) from secondary controller 266 when it determines that an item, or a number of items above a certain threshold number, was removed from a particular location. The camera may be activated by the signal to record video continuously or may take a still picture only when the signal is received.

One task of secondary controller 266 may be to switch antennae 270 mounted within a single shelf unit (or similar support unit) storing one or more items from inventory 170. Also, secondary controller 266 may be used to communicate information to and from a user (e.g., customer, retailer employee, etc.). For example, secondary controller 266 may receive from ISSA 200 (via database 215) item information about each item known to be on a shelf served by secondary controller 266. This item information may include current price, size, weight, unit price, and/or sale status (e.g., discount on a current sale price). The item information may be displayed on peripheral device 255, such as a shelf edge display. If there is more than one type of item on the shelf, there may be multiple shelf edge displays mounted on or near the shelf. Alternately, information for each item type might cycle sequentially on a single display, pausing for several seconds before continuing to the next item type. The shelf edge display may be provided with a user interface button to temporarily halt the display cycle and to request additional information about the product being displayed when pressed by the user. Also, if ISSA 200 senses an item being removed from the shelf based on data provided by DCS 160, it may instruct secondary controller 266 to display information associated with that item on the peripheral device 255.

Secondary controller 266 may also be configured to facilitate other interactive operations between ISSA 200 and a customer. In one aspect of the invention, a customer may be provided with an RFID-based customer card that includes an RFID tag containing information concerning or identifying a customer. The customer identification information may be related to information stored in database 215 or another memory device that maintains customer information, such as a current shopping list provided by the customer (via the Internet and browser software, kiosk device, etc.), and profile information associated with the customer and/or the customer's family members (e.g., clothing sizes, brand preferences, etc.). When a customer carrying a customer RFID card enters and moves throughout environment 110-1, the presence of the customer card in the vicinity of a shelf equipped with the RFID antenna associated with secondary controller 266 may cause a signal or data to be passed to ISSA 200 through primary controller 260. In response to the signal or data, ISSA 200 may direct secondary controller 266 to display information about an item at the shelf that detected the customer card, such as through peripheral device 255. In this instance, ISSA 200 may access database 215 to collect any customer information associated with the identifier corresponding to the detected customer card. ISSA 200 may then determine whether any items or types of items located near or at the shelf that detected the card relate to the customer information stored in database 215. For example, ISSA 200 may determine whether an item is included in a shopping list created by the customer and/or relates to a list of preferred products for the customer. Further, ISSA 200 may provide additional information to secondary controller 266 for display on peripheral device 255, such as the availability of the customer's size in the case of a clothing item, the availability of a rebate for an item, and the availability of sales or rebates for other items.

The exemplary features associated with secondary controller 266 are not limited to RFID-based customer cards. Methods and systems consistent with certain aspects of the invention may also allow a user who is an employee or similar individual affiliated with environment 110-1 to be assigned an RFID-based employee card. For example, a salesperson working for a retail store may be provided with an RFID-based employee card that may be detected by antenna 270 located in any shelf unit or similar structure included in the retail store. The presence of the RFID-based employee card within the vicinity of a shelf associated secondary controller 266 may cause ISSA 200 to provide commands to DCS 160 and ultimately secondary controller 266 that direct peripheral device 255 to display information associated with the shelf. For instance, the information displayed may include data that identifies any out-of-date items that must be removed from the shelf, items approaching an expiration date that may be relocated forward on the shelf, moved to another location (e.g., a promotional area), and/or offered at reduced price, items that are short on stock and where to locate additional units of the items within the store (e.g., environment 110-1), and items that are misplaced and where to relocate them within the store. For items low on stock but not available from a third party supplier, such as a warehouse, ISSA 200 may instruct secondary controller 266 to display a message that conveys expected delivery dates of new stock. Further, the message may also report an availability of a missing item at nearby stores or alternate locations remote from environment 110-1.

ISSA 200 and RRM 220 may also communicate with DCS 160 that is located at POS locations, such as checkout lanes. At these locations, ISSA 200 may interact with the POS system to facilitate certain sales transactions. For example, ISSA 200 may automatically register an item having a warranty with a manufacturer by using serial number information obtained from the EPC number of the item and/or customer identification information (e.g., name, address, etc.) collected from an RFID (or conventional) customer card. The customer may be given an option whether to accept the registration at the checkout lane, or to defer it until later.

Optimization of RFID Tag Reading Performed by DCS 160

In one aspect of the invention, reader 262 may send RF energy through an RF bus (e.g., cable) to antennae 270 through secondary controller 266. A single antenna 270, or a group of antennae 270 located adjacent to one another and working in concert, may be activated and operational at a given time based on signals provided by secondary controller 266 and/or reader 262. The active period for a given antenna 270 may be based on the amount of time it takes to collect information from RFID tags 280 located in proximity to the antenna 270. Secondary controller 266, under directions from the primary controller 260, may select and activate each antenna 270 in turn. The order in which antenna 270 are selected may be optimized so that the reader 262 may be shared among many antennae 270. The sharing of reader 262 may allow DCS 160 to collect inventory data more or less regularly, as well as focusing immediate attention on antennae 270 where one or more items are being moved. In one aspect of the invention, ISSA 200 may determine which antenna 270 to activate based on one more prioritization factors. These factors may include:

1) antennae 270 that are located in proximity to a RFID tag 280 that was most recently added or moved;
2) antennae 270 that are located in proximity of one or more antennae 270 with recent activity;
3) antennae 270 associated with one or more items known historically to have a high sales volume during a particular time period (e.g., time of day or week);
4) antennae 270 that are associated with a pushbutton request from a customer for information, such as an interactive display peripheral device 255 mounted on a shelf including the antennae 270;
5) antennae 270 that have an RFID card (e.g., customer or employee card) located within their read range;
6) antennae 270 that have not been activated for a predetermined period of time;
7) antennae 270 that have one or more theft-prone items within their read range, such as high end merchandise items (e.g., jewels, etc.);
8) antennae 270 that are expected to have a product of immediate interest to a user (e.g., employee or customer), such as when a user requests information reflecting whether a desired item is available "on shelf" or in a back inventory stock room;
9) antennae 270 that are associated with one or more items that have passed through a POS terminal within a predetermined period of time (e.g., recent POS sales); and
10) antennae 270 that are associated with one or more items approaching their shelf life.

One skilled in the art will appreciate that the above list of prioritizing factors is not intended to be limiting and ISSA 200 and/or a user may determine other prioritizing factors based on one or more variables and weighting factors associated with the characteristics of the items in inventory 170.

Performance Monitoring Capabilities of DCS 160

In one aspect of the invention, the hardware/software components of DCS 160, including primary controller 260, reader 262, and secondary controllers 266, may perform self-monitoring and self-diagnosing operations to determine and report any operational problems to ISSA 200. For example, to perform some self-diagnosing operations, a shelf unit may include, within the shelf's antennae 270 read range, at least one RFID tag to provide a self-check function. Accordingly, even when the shelf is empty (i.e., no items rest upon the shelf) there is at least one RFID tag that may be read by the antennae 270 included in the shelf. In one aspect of the invention, at least one such RFID tag may be embedded near the center of, or at another location easily read by, an antenna 270 included in the shelf and another RFID tag embedded near the antenna's 270 read-range limit. Secondary controller 266 may, either periodically or on command from ISSA 200, send test read signals/commands to the antenna of a target shelf 270 and monitor any responses collected from the embedded RFID tag(s) included in a corresponding shelf unit. In the event that secondary controller 266 does not receive a proper response from one or more embedded RFID tags, controller 266 (or another device, such as primary controller 260) may ascertain that a malfunction may have occurred.

To locate the source of a malfunction, DCS 160 may perform various self-test read operations through neighboring components to a target shelf unit and/or target antenna 270. For example, if another antenna 270 driven by the same secondary controller 266 can still be read, then DCS 160 may associate the malfunction with the target antenna 270. On the other hand, if all antennae 270 served by a given secondary controller 266 are not responding to command signals from the controller (i.e., not reading any RFID tags 280), then DCS 160 may associate the malfunction with the secondary controller 266. Further, if all antennae 270 served by a given primary controller 260 and reader 262 are not reading data from a secondary controller 266, then the problem is likely within the primary controller 260 or the reader 262. To determine which of these components is the source of the malfunction, DCS 160 may determine whether primary controller 260 may still communicate diagnostic data with one or more secondary controllers 266. If so, DCS 160 may associate the malfunction with reader 262. Additionally, if RS-485 serial data communication techniques are used between primary controller 260, reader 262, and one or more secondary controllers 266, DCS 160 may provide a sequential order of secondary controllers 266 that primary controller 260 may communicate with during a tag reading operation. Accordingly, if an RS-485 data cable is disconnected somewhere along its length, primary controller 260, having been provided beforehand with the sequence information indicating the order of the secondary controllers 266 along the RS-485 link, may determine at what point the RS-485 link was disconnected. In one aspect, acknowledgment command protocols may be performed by primary controller 260 to determine which secondary controller 266 is not responding to a command. That is, communications along the RS-485 link may include commands that are acknowledged by the receiving entity on the link, and lack of acknowledgment is another means to deduce where any problems may lie.

Exemplary Software Objects for ISSA 200

In one aspect of the invention, ISSA 200 may perform certain functions related to the present invention using object-oriented programming constructs and techniques. For example, ISSA 200 may employ web services to perform certain functions related to aspects of the present invention. Table II shows a list of exemplary software objects that may be implemented by ISSA 200 that may be used by one or more processes (e.g., tasks 231-239) and interact with one or more of the exemplary tables included in database 215.

TABLE II

| | Exemplary Software Objects | |
|---|---|---|
| Web Service Methods | IssaServ/Admin.asmx | Handles all administrative related functions |
| | GetEPCReadersListXML | Retrieves selected Req. Broker's list of zones |
| | GetUserListXML | Retrieves list of users |
| | StartRequestBroker | Tell Broker Mgr to START selected Req Broker |
| | GetRequestBrokerDetailXML | Retrieves selected Req Broker's info |
| | SaveRequestBroker | Saves Req Broker's data |
| | GetReguestBrokerListXML | Retrieves list of Req Brokers |
| | SaveEPCReader | Saves the zone's data |
| | StopRequestBroker | Tell Broker Mgr to STOP selected Req Broker |
| | StartAllRequestBrokers | Tell Broker Mgr to START all Req Brokers |
| | GetEPCReaderDetailsXML | Retrieves selected zone's info |
| | SaveUser | Saves the user's data |
| | DemoGetZonesInvListXML | Retrieves list of items on selected list of readers |
| | StopAllRequestBrokers | Tell Broker Mgr to STOP ALL Req Brokers |
| | GetRequestBrokerStatus | Retrieves the current status of a Req Broker |
| | GetUserDetailXML | Retrieves selected user's info. |
| Web Service Method | IssaServ/Inventory.asmx | Handles all inventory related functions. |
| | GetItemDetail | returns item detail for a given SKU including product information, EPCs and locations. |
| Web Service | IssaServ/OutOfStock.asmx | Interface for client application for executing all business logic functions related to out of stock functionality. |
| Methods | GetInventoryXML | Returns XML Stream of physical inventory. Data are retrieved from tblInv. |
| | OutOfLimitSKUXML | Returns XML Stream of all SKUs over or under a baseline inventory. |
| | MisplacedSKUXML | Returns XML stream of all SKUs that are currently misplaced on shelves. |
| | SkUArrangement | Returns XML stream of SKUs and their currently acceptable locations. |
| | SetShelfArrangement | Sets the current shelf arrangement, and optionally sets the baseline inventory. |
| Web Service | IssaServ/InventoryRequest.asmx | Initiated from Inventory Read Request Interface. Executed when EPC codes are sent from Response Broker. |
| Method | ReadEPC | Updates tblCurEPC, and tblRemEPC |
| Web Service | IssaServ/Shrinkage.asmx | Handles all product shrinkage related processes. |
| Methods | MajorPullXML | Returns XML Stream of SKUs or a SKU that has been pulled from location(s) in a specified amount of time based on a specified quantity. |
| | InventoryCompareXML | Compares tblInv and tblERPinv and returns XML Stream of SKUs and locations where inventory variance is greater or less than a given value. |
| Web Service Method | IssaServ/Login.asmx | Handles all user related functions. |
| | Login | Validates a given user name and password. |
| Web Service | IssaServ/RapidRecall.asmx | Used for RapidRecall related processes. |
| Methods | ExpiredProductsXML | Returns XML Stream of all products that have been expired based on an expiration date in the tblSKU table. |
| Web Service | IssaServ/Alerts.asmx | Used for all alert related functions |
| Methods | GetInventoryAlertJobs | Retrieve current inventory alert configuration info |
| | GetCurrentAlertsXML | Returns an XML Stream of all the current alerts in the system. |
| | RemoveAlerts | Remove specified alerts from database |

TABLE II-continued

Exemplary Software Objects

| | NewInventoryAlertJob | Sets an alert job to monitor products in a given location that go above or below a given percentage of their baseline inventory |
|---|---|---|
| | ConfirmAlerts | Update selected list of alerts to show confirmation |
| | NewInventoryRemovalJob | Sets an alert job to monitor products have been removed in a given quantity in a given amount of seconds. |
| Web Service | IssaServ/LookupLists.asmx | Handles all drop-down list population functions |
| Method | GetLists | Returns items to populate give drop-down list |

Jobs 240

Jobs 240 may be one or more processes that are executed internally and/or externally from ISSA 200 and may be used to trigger alerts and retrieve information from remote locations, such as a manufacturer's website, or from entities located within environment 110-1. Each process, or job, included in Jobs 240 may be developed using known programming languages, such as the JAVA programming language and JDBC provided by Sun Microsystems, Inc., and known scheduling software, such as Microsoft Scheduler.

In one aspect of the invention, Jobs 240 may include an inventory limit job that runs periodically (e.g., every 60 seconds) and monitors inventory levels based on configurations that may have been set by a user through a user interface provided in interface 210 and stored in a configuration table within database 215. This job may generate an inventory out of limits alert if any inventory items are found to be out of bounds relative to the baseline inventory (e.g., current stock above and/or below a predetermined value). The alert may be generated using an alert method, such as the exemplary Web-Service ISSAserv/Alerts.asmx/NewInventoryAlertJob method described in Table II. In one aspect of the invention, the inventory limit job may direct a message provisioning service to send an e-mail to one or more predefined users each time an inventory out of limits alert occurs.

Jobs 240 may also perform a wrong shelf job that may run continuously and monitors misplaced items that are on an incorrect shelf. If ISSA 200 determines that an item is located on an incorrect shelf, Jobs 240 may generate an alert message corresponding to that type of alert (i.e., misplaced item) and insert it into a table within database 215, such as an alert table (e.g., tblAlerts). In one aspect of the invention, the wrong shelf job may direct a message provisioning service to send an e-mail to one or more predefined users each time a misplaced item alert occurs.

Jobs 240 may also perform a removal limit job that may run continuously and monitor items that have been removed from their designated locations (e.g., shelf) in a quantity and time period specified by a user via user interface 210. The removal limit job may generate and store information associated with the removed items in a table in database 215, such an inventory removal table (e.g., tblInventoryRemove). Further, if this job determines one or more items that have been removed based on the specified quantity and time period values, this job may create a new alert message associated with this condition and insert into the alert table (e.g., tblAlerts).

Jobs 240 may also perform an expired products job that may run every day at a predetermined time (e.g., 12:01 a.m.), and determine whether any items have been located in inventory 170 have reached or exceeded their corresponding expiration limit (e.g., expiration date). If the expired products job finds an item that has been expired, or is approaching an expiration date, it may create a corresponding alert message and insert it into the alert table (e.g., tblAlerts).

Further, Jobs 240 may perform a SKU update job that may run periodically (e.g., every 10 minutes) that identifies any new items (e.g., SKUs) that may have been added to environment 170. This job may request item information associated with the identified new items from an ERP system or a manufacturer's website using XML.

Also, Jobs 240 may perform a manufacturer update job that may run periodically (e.g., every 10 minutes) that monitors a table in database 215 that is updated when an item is included in inventory 170 that is provided by a manufacturer that is not registered with ISSA 200 (i.e., a new manufacturer). This update job may retrieve information associated with the new manufacturer from the manufacturer's website or other type of external data source.

EPC Writer

As the RFID tag industry grows, it is expected that items may be "source-tagged." That is, the RFID tags 280 may be applied to items and the EPCs written to the tags by a manufacturer. There may be instances, however, when items are included in inventory 170 that do not include source tagged items. Accordingly, environment 110-1 may perform an EPC writer process that is designed to write EPCs to RFID tags 280. Since the EPC process may be configured to access data on a particular tag one at a time, the process may be performed by a system that is separate from ISSA 200. Alternatively, ISSA 200 may include a separate EPC writer process (in addition to, or in place of, EPC writer task 234) that is executed by IIMS 105.

The EPC writer process may be a Windows® executable process that may use .NET serial implementations to communicate to reader 262. The EPC writer may store, in a file location, the number for the last EPC written to an RFID tag for a given manufacturer and its SKU information (e.g., item type information). Further, the EPC writer process may store a range of serial numbers, SKU information, and manufacturer ID's for an EPC and write this EPC information to the memory of one or more RFID Tags 280. Also, the EPC writer may write to RFID tags based on a standard, such as the Philips SLRM900 specification, depending on the type of RFID tags implemented by environment 110-1. Alternatively, the EPC writer may write to tags using RS-232 or other serial interface communication protocols.

In one aspect of the invention, inventory 170 may include one or more RFID enabled shelves that include communication capabilities with peripheral device 255, such as a bar code reader. Accordingly, each shelf may, at least temporarily or periodically, exclusively communicate with the EPC writer process. For instance, a group of items of a certain type may be placed on a shelf by a user (e.g., stock person). One of the items may be scanned with a bar code reader to determine its corresponding UPC number. The EPC writer may then sequentially assign EPC numbers to each item in the group by incorporating the information derived from the UPC number.

Differences between a common UPC and an EPC are shown in Table III. A UPC may consist of decimal (i.e., base ten) data including manufacturer number, object number, and a check digit, totaling 12 digits. An EPC includes binary data that may include a header, manufacturer number, object number, and electronic serial number. In both the UPC and EPC, the manufacturer number may be assigned by a governing body, such as price code standards governing body. An object class (including the object number) may be assigned by a manufacturer. In the case of an EPC, the serial number may also be assigned by the manufacturer.

TABLE III

Differences Between UPCs and EPCs

| | UPC code fields | | 12 Bits Total | |
|---|---|---|---|---|
| field size: | 6 digits | 5 digits | | 1 digit |
| resolution: | 1 million | 100 thousand | | 10 |
| description: | manufacturer | object class or SKU | | check digit |

| | EPC code fields | | 96 Bits Total | |
|---|---|---|---|---|
| field size: | 8 bits | 28 bits | 24 bits | 36 bits |
| resolution: | 256 | 268 million | 16 million | 68 billion |
| description: | header | manufacturer | object class or SKU | EPC serial number |

In situations where a manufacturer or manufacturers have not been assigned EPC manufacturer codes, the EPC writer may use arbitrary number assignments until the EPC manufacturer codes are assigned. Alternatively, the existing UPC manufacturer codes, which fit directly into the larger EPC manufacturer field, may be used. Also, the existing UPC object class would fit into the larger EPC object field.

In such situations where a governing body has not assigned manufacturer's codes, the EPC writer may be used in an arbitrary pseudo-EPC field arrangement for use in initial inventory operations, such as trial inventory management processes that incorporate the current UPC field values or arbitrary values as the manufacturer's codes. However, if a standard EPC field arrangement has been implemented, the EPC writer may be used by environment 110-1 to ensure items are properly tagged. Also, if a standard EPC field arrangement is promulgated, the EPC writer may be used by retailers, distribution centers or manufacturers, possibly for limited product lines. One skilled in the art will appreciate that in the event RFID tagging becomes more widespread and "source tagging" by the manufacturer becomes common, use of the EPC writer may diminish at retail locations but increase at manufacturing sources, which may implement methods, systems, and articles of manufacture consistent with certain aspects of the invention.

If the pseudo-EPC field arrangement is implemented described above, environment 110-1 may assign EPC codes by defining a determined number of fields (e.g., three) for the pseudo-EPC number. For example, the pseudo-EPC number may be arranged with an 8-bit header (1111,1111) that corresponds to the type header in the EPC, a 52-bit UPC field that is divided into 13 subfields of 4 bits each, and a 36-bit serial number field, such as a sequential number, 0 to 68,719,476, 735). The size of the data segments in the EPC may vary without departing from the scope of the present invention.

The UPC number is made up of up to 13 digits, using the binary representation of each digit, one nibble per UPC digit. That is, 0 is 0000,1 is 0001, 2 is 0010, . . . and 9 is 1001. Individual packages of a given item may be assigned unique serial numbers until more than 68.7 billion packages are encountered. Note that there may be a difference in how the UPC number and the serial number are treated by the EPC writer and environment 110-1 when converting to a binary representation. In the case of the UPC number, each UPC digit (up to 13 digits) is assigned a nibble in the EPC. A binary conversion may be performed by EPC writer digit by digit, keeping particular decimal digits in correspondence with particular EPC nibbles. In the case of the EPC serial number, however, a straight conversion may be performed from the decimal serial number to the binary serial number, which is recorded in the 36-bit EPC field.

For example, consider an exemplary 96-bit pseudo-EPC code that has been filled with an exemplary barcode for a type of item (e.g., a 10-fl oz bottle of a multi-symptom cold/flu relief medicine). The barcode may be 23900,00296 (or 000, 23900,00296 in 13-digit form). A serial number of 34782 may have been assigned to make the package for this item type unique. In binary representation, 34782 is 0100,0011, 1110,1111. Table IV shows the corresponding EPC and UPC data associated with this exemplary item type.

TABLE IV

Exemplary UPC and EPC codes for Exemplary Item Type

| EPC nibble | pseudo-EPC bits | UPC digit | Description |
|---|---|---|---|
| 1 | 1111 | | 8-bit header, first half |
| 2 | 1111 | | 8-bit header, second half |
| 3 | 0000 | 0 | $13^{th}$ nibble - $13^{th}$ UPC digit |
| 4 | 0000 | 0 | $12^{th}$ nibble - $12^{th}$ UPC digit |
| 5 | 0000 | 0 | $11^{th}$ nibble - $11^{th}$ UPC digit |
| 6 | 0010 | 2 | $10^{th}$ nibble - $10^{th}$ UPC digit |
| 7 | 0011 | 3 | $9^{th}$ nibble - $9^{th}$ UPC digit |
| 8 | 1001 | 9 | $8^{th}$ nibble - $8^{th}$ UPC digit |
| 9 | 0000 | 0 | $7^{th}$ nibble - $7^{th}$ UPC digit |
| 10 | 0000 | 0 | $6^{th}$ nibble - $6^{th}$ UPC digit |
| 11 | 0000 | 0 | $5^{th}$ nibble - $5^{th}$ UPC digit |
| 12 | 0000 | 0 | $4^{th}$ nibble - $4^{th}$ UPC digit |
| 13 | 0010 | 2 | $3^{rd}$ nibble - $3^{rd}$ UPC digit |
| 14 | 1001 | 9 | $2^{nd}$ nibble - $2^{nd}$ UPC digit |
| 15 | 0110 | 6 | $1^{st}$ nibble - $1^{st}$ UPC digit |
| 16 | 0000 | | $9^{th}$ nibble of serial number |
| 17 | 0000 | | $8^{th}$ nibble of serial number |
| 18 | 0000 | | $7^{th}$ nibble of serial number |
| 19 | 0000 | | $6^{th}$ nibble of serial number |
| 20 | 0000 | | $5^{th}$ nibble of serial number |
| 21 | 0100 | | $4^{th}$ nibble of serial number |
| 22 | 0011 | | $3^{rd}$ nibble of serial number |
| 23 | 1110 | | $2^{nd}$ nibble of serial number |
| 24 | 1111 | | $1^{st}$ nibble of serial number |

Figure 3:
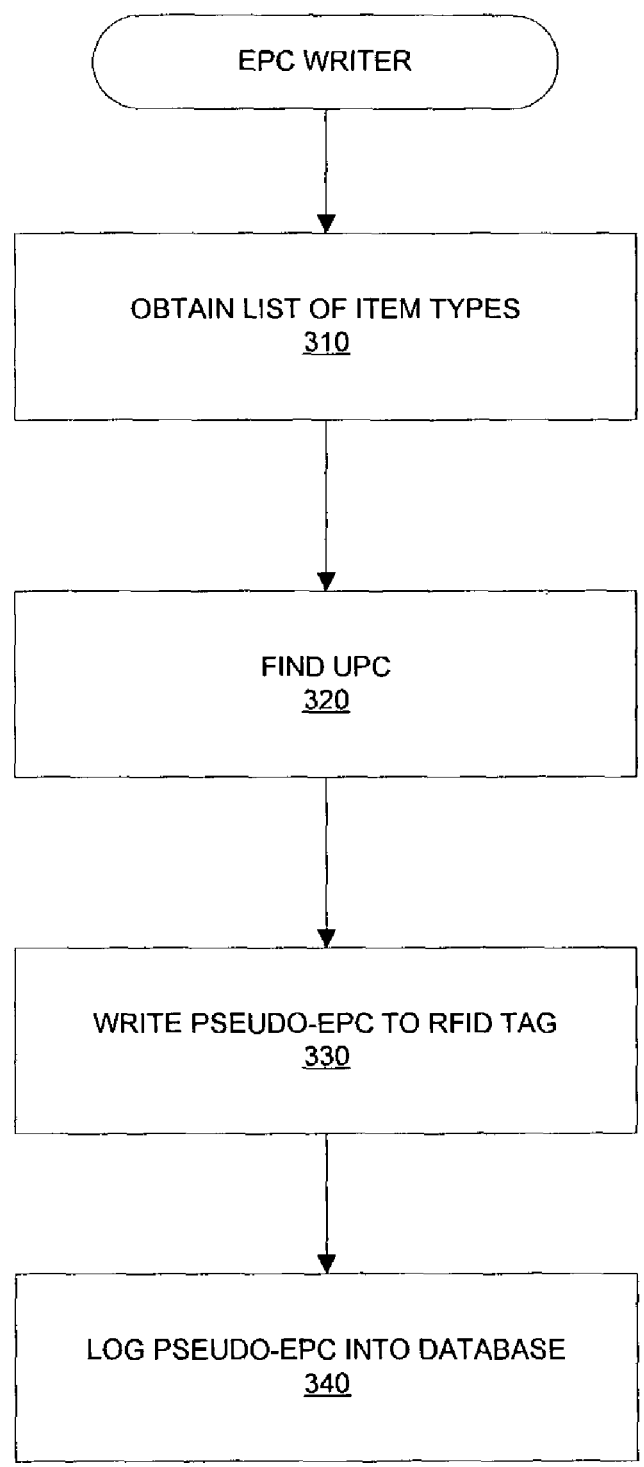
FIG. 3 is a flowchart of an exemplary EPC writer process consistent with certain aspects related to the present invention.

To facilitate assignment of the appropriate pseudo-EPC number to tagged items, the EPC writer may record the 12- or 13-digit UPC number electronically at the time when the serial number is assigned and the RFID tag 280 is applied to the package of the item. FIG. 3 shows a flowchart of an exemplary EPC writer process that may perform the above described RFID tagging process. As shown, the EPC writer process may obtain a list of SKUs (item types) to be tagged (Step 310). This list may include the UPC number for each item type and a character string identifying the item, and may be stored in a SKU table that may be filled by any known type of barcode scanning software and/or hardware. In one aspect of the invention, the SKU table may include three fields, a UPC number field, a manufacturer name field, and a character string to include general description information, such as size, flavor, etc.

At the time when an RFID tag 280 is to be assigned to an item, the EPC writer process may call EPC writer task 234 that operates as an assignment module in ISSA 200. The call may direct task 234 to access the SKU table (which may be stored in database 215) and locate a corresponding UPC for each SKU included in the list obtained in Step 310 (Step 320). For example, EPC writer task 234 may generate a query to search the SKU table for manufacturer and/or item name.

Once a UPC is located for a corresponding SKU, the EPC writer task 234 may provide this information back to the EPC writer process. Once received, the EPC writer process may use the UPC to write the entire pseudo-EPC number to the RFID tag on each package of the item type, by for example, using a write to tag command that is executed by the RFID reader (Step 330). This step assigns the unique serial numbers to each tag. Further, the EPC writer process may log the pseudo-EPC into a table during this procedure, such as a table stored in database 215 (Step 340).

In one aspect of the invention, an RFID tag 280 may contain both the serial number that is assigned as the unique RFID tag number and the pseudo-EPC number that is encoded as extra data. Although the pseudo-EPC number includes information that identifies an item, the serial number may be read faster by reader software/hardware than the pseudo-EPC number. For example, an anticollision select command provided by certain bar code readers, such as the Philips reader, may automatically return the RFID tag serial numbers. In instances where the type of items located on a particular shelf change very little from one RFID tag read operation to another, the read cycle for obtaining the pseudo-EPC number may be improved by storing the EPC information and corresponding serial number information in a local cache memory device (not shown). Accordingly, the reader may issue an anticollision select command when attempting to read an RFID tag 280 and initially receive the RFID tag serial number. The reader may then determine whether the tag serial number is located in the local cache. If it is, then the reader may retrieve the corresponding EPC number from the cache. If the tag is not stored in the cache, then the reader may read the tag data blocks to obtain the pseudo EPC number. The RFID tag serial number and EPC number may then be added to the cache for a subsequent read cycle. Environment 110-1 may perform a purge process that may purge the tag information contained within the cache on a periodic basis. This may provide similar data access performance as a relational type database containing the tag serial number and EPC, with less data management delays.

User Interface Pages

Figure 4:
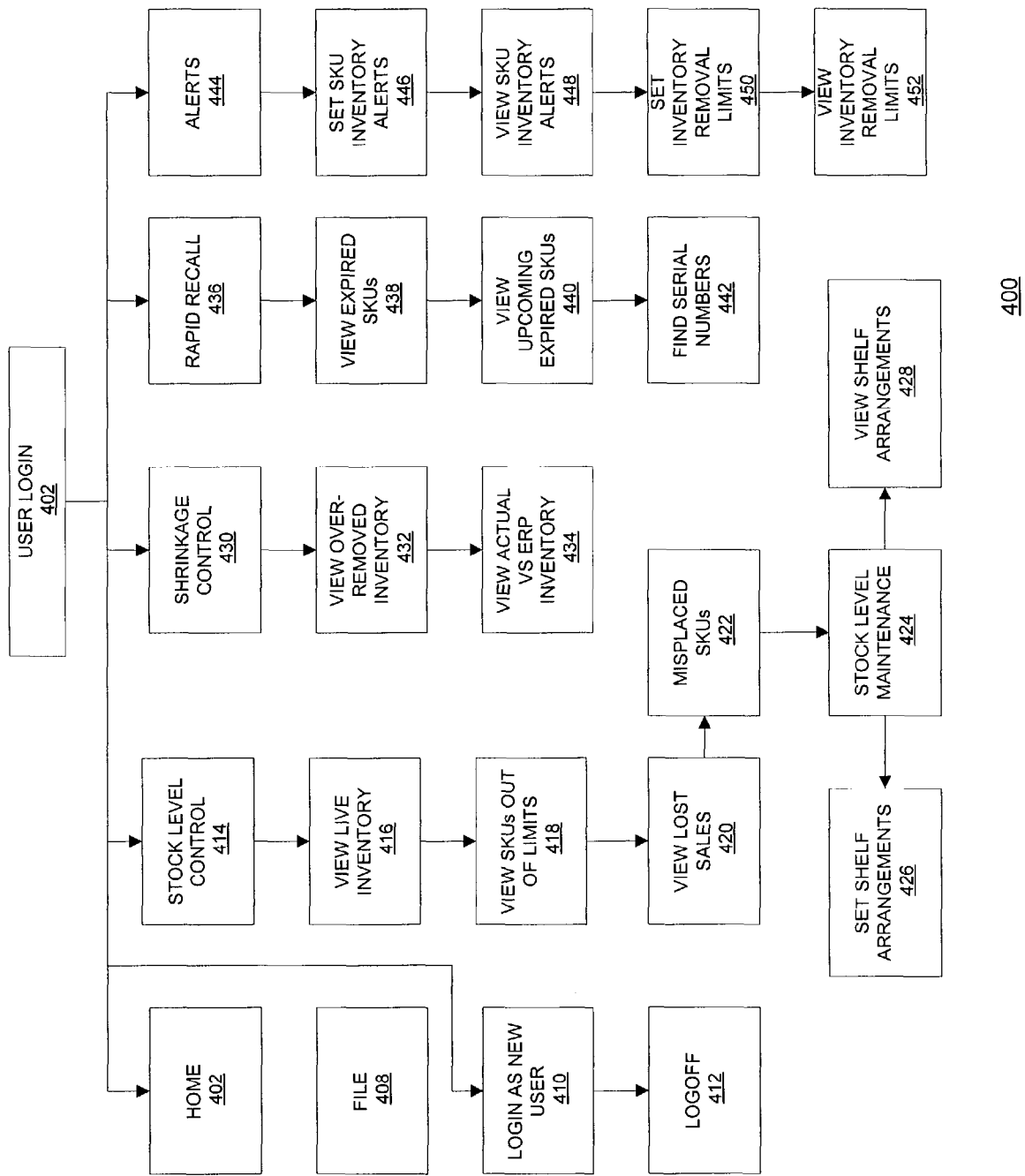
FIG. 4 is a block diagram of an exemplary interface map consistent with certain aspects related to the present invention.

User interface 210 may provide content-based interfaces to a user that enables the user to request and input information associated with the intelligent inventory management functions consistent with certain aspects related to the invention. FIG. 4 shows an exemplary interface map 400 that provides a framework that ISSA 200 may implement to respond to inquiries from a user via user interface 210. Each box in map 400 may represent a page process performed by user interface 210 that allows a user to request and/or receive information. Each page may check a security key carried in a session for a current user to determine whether the user is allowed access to the corresponding page. Further, each page may post an XML document to ISSA 200 and retrieve XML information. Also, content may be displayed on a display device (e.g., display 204) by applying style sheets to XML from COM+ components described for each page. Further, the page process in map 400 may interact with corresponding one or more processes included in ISSA 200 (e.g., tasks 231-239) and jobs 240.

As shown, FIG. 4 includes a home page 402 allows that allows a user to navigate to other pages displayed by the page process in map 400. Among these pages is a user login page 410 that allows a user to enter a username and password. Page 410 may then initiate a login process, such as a WebService ISSAserv/Login.asmx/Login method. If the user is a valid user, the login page process may direct user interface 210 to execute home page process 402. Otherwise, login page 410 may again request a user name and password.

File page 408 directs the user to login as new user page 410 which allows the user to create and edit user information and to set up alert subscriptions (e.g., define certain types of alerts that are desired to be reported). Logoff page 412 page allows the user to log off from the current login session.

Stock level control page 414 allows the user to access various inventory level information by directing the user, for example, to View Live Inventory page 416. This page allows users to view the current physical inventory at a particular location, such as a shelf. The user may generate a query using various fields defined by user interface 210. Table V shows a list of exemplary search fields a user may use to filter a search. Once the query is entered by the user, interface 210 may display a search results for Live Inventory page 416 that initiates a process (e.g., WebService ISSAserv/OutofStock-.asmx/GetInventoryXML) that allows the user to search and view information associated with an item. This process may allow the user to receive information from another page, such as an Item Detail page (not shown). In one aspect of the invention, a user who is a vendor with merchandise included in environment 110-1 may be given limited local or remote access to the View Live Inventory page 416 to ascertain whether their item is being displayed according to preset agreements. For example, the vendor may determine whether their items are presented on a certain number of shelf facings, located in a particular location within a store, whether their items are positioned in a preferred location within a set of shelves, such as at eye level as opposed to higher or lower levels, etc.

TABLE V

Search Fields

Manufacturer
SKU Number
Category
Current Inventory Count (From, To) (on-shelf)
Current Inventory Count (From, To) (back room or warehouse)
Expected Inventory Count (From, To) on order
Expected Delivery Date
Serial Number (From, To)
Price (From, To)
Cost (From, To)
Aisle Number
Gondola Number
Shelf Number
EPC Reader (For debugging purposes)
Revenue (price × velocity)
Time an Alert is active
Time elapsed since last sale
Time elapsed since item count dropped below a critical threshold
Time since an out-of-date, or until an out-of-date
Other arbitrarily assigned or calculated priority codes The Item Detail page (not shown) may perform a process that allows a user to view information associated with an item, determine where the item is currently located in environment 110-1, and a time when the item was placed at that location. Items may be considered to be located at a particular physical location (e.g., a particular shelf) if the item is read by a single reader antenna 270, or on a "virtual shelf" if the item is read by multiple reader antennae 270 that are associated with each other in a relationship table, such as a tblRelatedEPC table included in database 215.

The View SKU Out of Limits page 418 allows a user to view information associated with one or more item types that are currently over or under an allowable percentage of baseline inventory. The user may be able to filter a search by using the fields shown in Table V. Once the filter information is entered by the user, user interface 210 may display a search results for SKUs out of limits page (not shown). This page may initiate a process (e.g., WebService ISSAserv/OutofStockasmx/OutofimitsSKUXML) that shows a user a current inventory for a given item or item type at a current location. Further, the process may also provide the baseline inventory value for that item at the specified location, and the difference the current inventory deviates above or below the desired baseline inventory. Furthermore, the process may display the allowable percentage over and under for a given SKU and location. This out of limits information may be used by ISSA 200 to suggest which out-of-limits items to restock first based on expected sales information provided by a user and/or a software process that produces this information. ISSA 200 may also access current and historical sales data maintained in a memory device (e.g., database 215) to generate a report predicting expected times at which each item may become out of stock. Also, ISSA 200 may use various factors, such as pricing, seasonality, etc., to adjust the predicted information provided in the report.

The View Lost Sales page 420 may allow a user to view information associated with item types that have lost sales due to being out of stock. The user may be able to filter a search query for these SKUs using the fields listed in Table V. Once the filter information is entered, by a user, user interface 210 may display a search results for lost sales page (not shown). This page may initiate a sales estimation process that shows the user an estimate of the sales (e.g., in dollars) lost due to the items of the item type being out-of-stock. The estimate provided by the sales estimation process may be based on a comparison of inventory levels, sales volume (current and historical), and traditional correlation of sales events for similar types of items. For example, ISSA 200 may access inventory data, sales information, etc. from database 215 to perform the comparisons used by the sales estimation process. The estimate of out-of-stock lost sales may be also be based entirely on factors provided by a user (e.g., administrator, retailer manager, etc.) to describe substitution rates associated with the similar item types. Alternatively, ISSA 200 may be configured to train itself by recognizing trends associated with previous sales of these item types and mining it from a database including similar information.

The Misplaced SKUs page 422 may allow a user to view information associated with items that are currently positioned in an incorrect location within environment 110-1. The user may be able to filter a search for misplaced items using the fields in Table V. Once the filter information is provided by the user, interface 210 may display a search results for misplaced SKUs page. This page may initiate a process (e.g., WebService ISSAserv/OutofStock.asmx/MisplacedSKUXML) that displays any current items that are misplaced and their current location in environment 110-1. The user may elect an item using, for example, the item's SKU information, from a list displayed on a display device to view the location of the selected SKU.

Stock level maintenance page 424 directs the user to pages (e.g., 426 and 428) that allow the user to configure and/or view current inventory arrangements in environment 110-1. The View Shelf Arrangement page 428 may allow a user to view information regarding any item in inventory 170 and their corresponding currently assigned locations in environment 110-1. The user may be able to filter a search using the fields in Table V. Once the filter information is entered by the user, user interface 210 may display a current shelf arrangements page (not shown). The arrangements page may perform a process (e.g., WebService ISSAserv/OutofStock- .asmx/SKUArrangement) that shows items and their allowable locations (e.g., locations in environment 110-1 that are assigned to the respective items). ISSA 200 may access item price and/or sales velocity data from a database (e.g., database 215) to provide prioritized locations within environment 110-1 that items of certain types may be placed to promote increased sales and/or movement of these items.

The Set Shelf Arrangement page 426 may allow a user to set a location for certain types of items, a category of items, items provided by certain manufacturers, a specific SKU number, and a particular range of locations within environment 110-1 (e.g., an aisle, a gondola, and/or a shelf). Page 426 may also allow a user to set the baseline inventory for each item type. Further, environment 110-1 may implement planogram software, which is a plan (e.g., a diagram, picture, etc.) that describes how and where products should be placed on retail shelves and displays. A planogram analyzes space utilization, provides financial data, along with other reports that permit retailers and manufacturers to effectively plan, set-up and manage their businesses to maximize profitability of retail space. Accordingly, the set shelf arrangement page may be downloaded from a planogram program executed by environment 110-1. Likewise, ISSA 200 may allow the planogram program to update current inventory information using the interface page information provided by the inventory data provided by the pages in map 400. Also, the planogram routine may be incorporated into ISSA 200 for execution by IIMS 105.

The Shrinkage Control page 430 directs the user to shrinkage information provided by pages 432 and 434. The View Over Removed Inventory page 432 may allow a user to filter items by individual items, by a category of items, items provided by a particular manufacturer, by SKU numbers that are in locations within environment 110-1, by particular locations within environment 110-1 (e.g., an aisle, a gondola, and a shelf number). Page 432 may allow the user to view the requested items that have been removed from their designated locations in a determined quantity within a certain period of time that may be specified by the user. It also displays an Over Removed Inventory Results page (not shown). This page may initiate a process (e.g., WebService ISSAserv/Shrinkage.asmx/MajorPullXML) that may show the location, item information, a time when a first item of the number of items was removed from the designated location, a time when a last item of the number of items was removed, and how many items were removed in that time period.

The View Actual vs. ERP Inventory page 434 may allow a user to receive information associated with items located in environment 110-1 that have a user defined percent variance over and/or under a defined inventory level. The user may filter a search of these items individually, by a category of items, by items provided by a particular manufacturer, and a SKU number that is in a location within environment 110-1, such as an aisle, a gondola, and a shelf number. Inventory page 434 may show an Actual vs. ERP Results page (not shown). This results page may initiate a process (e.g., WebService ISSAserv/Shrinkage.asmx/InventoryCompareXML) that may show the physical inventory present in inventory 170, such as those items located on shelves, a business defined inventory (e.g., an ERP inventory), and the percentage variance between the two.

The Rapid Recall page 436 may direct the user to one or more pages (e.g., 438-442) that provide information associated with items that may have expired or are approaching an expiration date. The View Expired SKUs page 438 may allow a user to filter items individually, by a category of items, by items provided by a particular manufacturer, by a SKU number that may be in a location within environment 110-1, such as an aisle, a gondola, and a particular shelf. Page 438 may display an Expired SKUs Results page (not shown) that may initiate a process (e.g., WebService ISSAserv/RapidRecall.asmx/ExpiredProductsXML) that may show item descriptions, locations of items have that have expired, and a time period that these expired items have been located in their current location since their corresponding expiration dates.

The View Upcoming Expired SKUs page 440 may allow the user to filter items individually, by a category of items, by items provided by a particular manufacturer, by a SKU number that may be in a location within environment 110-1, such as an aisle, a gondola, and a particular shelf. Page 440 may allow a user to receive information regarding items that are going to expire within a certain period of time (e.g., minutes, hours, days, weeks, etc.). Further, page 440 may display an Upcoming Expired SKU Results page (not shown). This results page may perform a process (e.g., WebService ISSAserv/RapidRecall.asmx/ExpiredProductsXML) that may show the locations and associated items that are due to expire within the certain period of time for the given products based on the user defined filter.

The Find Serial Number page 442 may allow a user to view items within a certain serial number range. The user may be able to filter a search using the fields in Table V. Once the filter information is provided by the user, user interface 210 may display the Search Results for Live Inventory page, described above. This page may perform a process (e.g., WebService ISSAserv/OutofStock.asmx/GetinventoryXML) that provides information regarding items with corresponding serial numbers within the range specified by the user.

The Alerts page 444 may direct the user to one or more pages (e.g., pages 446-452) that allow the user to receive and/or set information associated with one or more types of inventory alerts. The Set SKU Inventory Alert page 446 may allow the user to set an alert configuration for items that drop below or go above a defined percentage of a base line inventory. Alert page 446 may allow the user to set the alert configuration for all items in inventory 170, for items of a particular type, for a category of items, for items provided by a manufacturer, and for particular SKU numbers that are positioned in particular locations within environment 110-1, such as an aisle, a gondola, and a particular shelf. Alert page 446 may initiate a process that performs the desired monitoring set by the user (e.g., WebService ISSAserv/Alerts.asmx/NewinventoryAlertJob).

The View SKU Inventory Alerts page 448 may show an alert configuration for the items and their corresponding locations in environment 110-1 that are currently being monitored by an inventory alerts process. Page 448 allows the user to remove inventory alert configurations that are no longer needed.

The Set Inventory Removal Alerts page 450 may allow a user to set an alert configuration for situations where a determined number of items are removed within a determined time period. Page 450 may allow the user to set these types of alert configuration for individual items, all items, for a category of items, for items provided by a particular manufacturer, and for items with a SKU number that may be in a location within environment 110-1, such as an aisle, a gondola, and a particular shelf. Page 450 may initiate a process that performs the configurations described above, (e.g., WebService ISSAserv/Alerts.asmx/NewInventoryRemovalJob).

The View Inventory Removal Limits page 452 may show alert configurations for the items and their corresponding locations in environment 110-1 that are currently being monitored by an inventory removal limits process. This page may allow the user to remove configurations of inventory removal limits that are no longer needed.

One skilled in the art will appreciate that the pages shown in FIG. 4 and described above are exemplary and not intended to be limiting. Environment 110-1 may implement fewer or additional types of pages that perform various functions that may or may not be associated with the inventory management aspects related to the invention. For example, user interface 210 may include one or more page processes that provide the user with general and/or specific assistance in navigating the pages provided by interface 210. Further, interface 210 may include one or more pages that allow the user to set, view and/or modify various characteristics associated with individual items or item types, such as price, size characteristics, defect status, etc. Additionally, interface 210 may include one or more page processes that allow a user to view customer related information, such as customer profile information that is used with a customer ID card.

Inventory Management Processes

Figure 5:
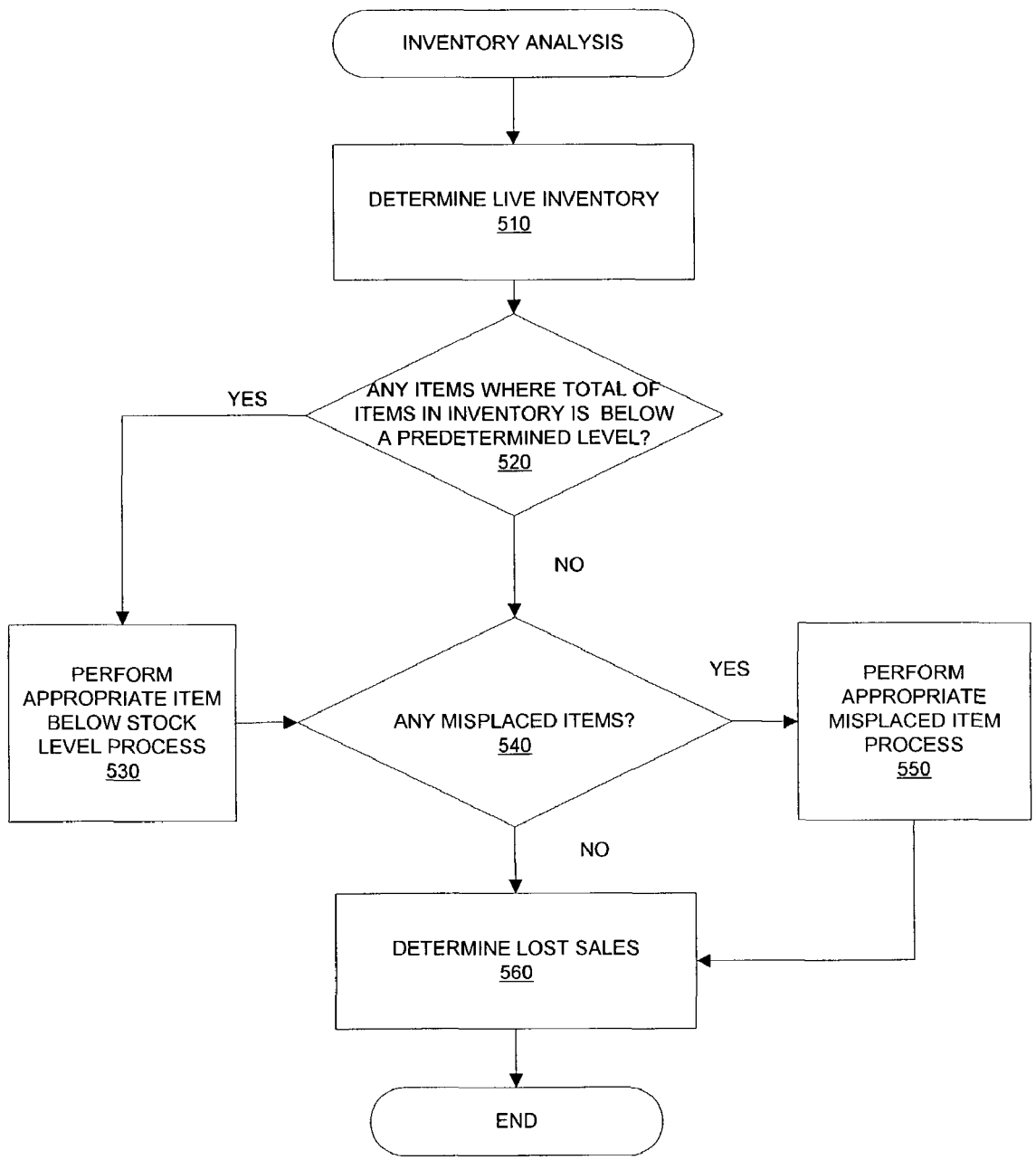
FIG. 5 is a flowchart of an exemplary inventory analysis process consistent with certain aspects related to the present invention.
Figure 6:
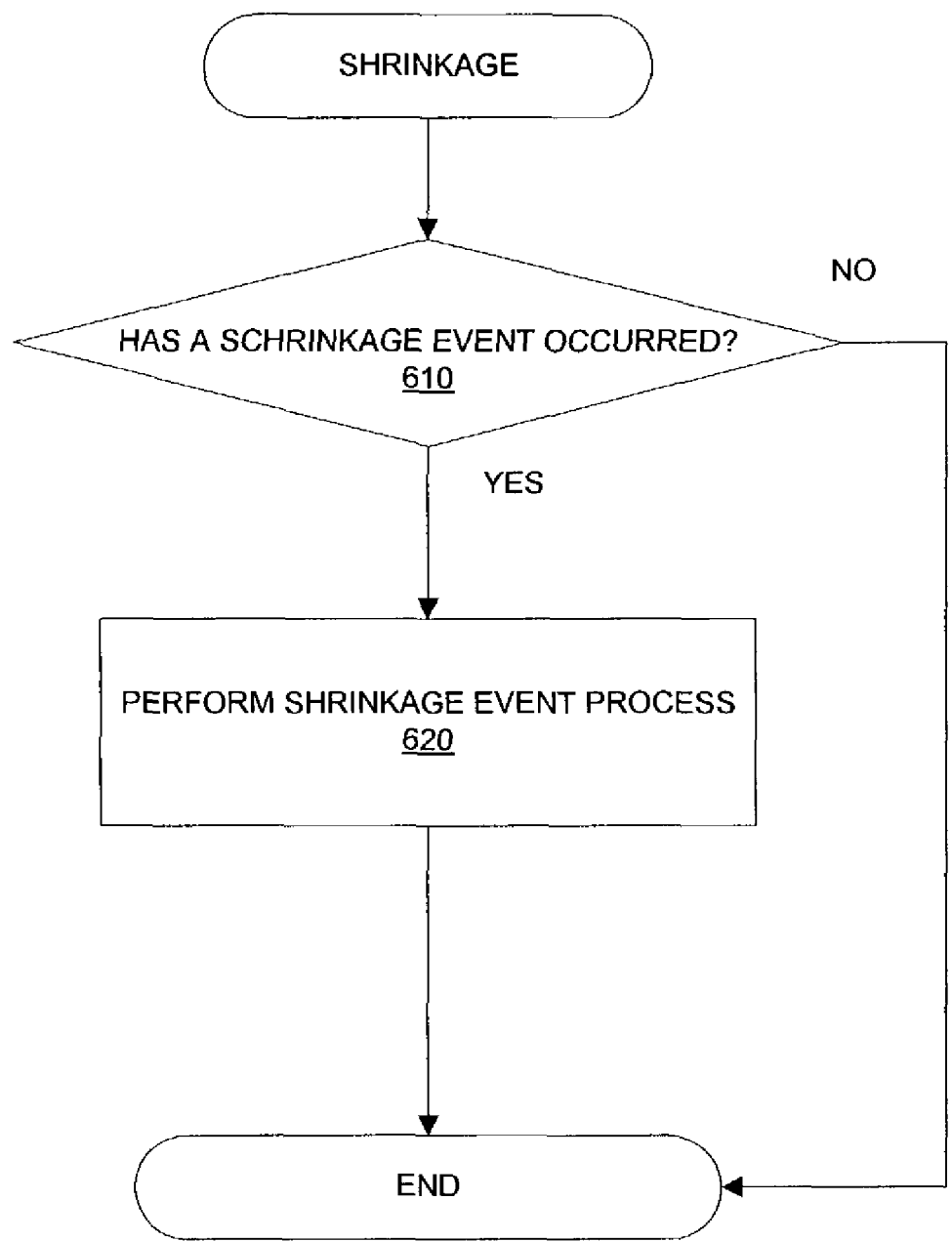
FIG. 6 is a flowchart of an exemplary shrinkage process consistent with certain aspects related to the present invention.
Figure 7:
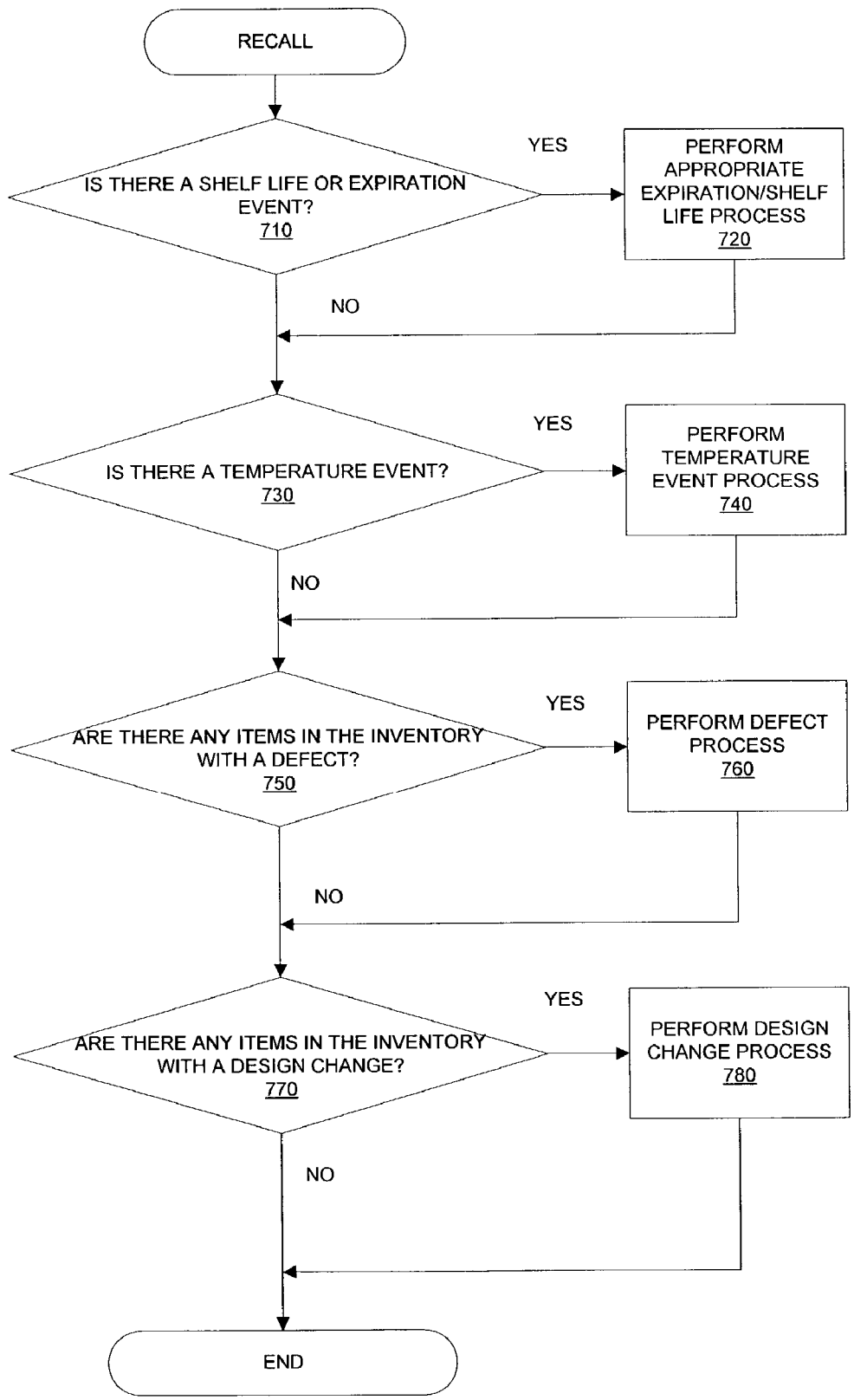
FIG. 7 is a flowchart of an exemplary recall process consistent with certain aspects related to the present invention.

As described, environment 110-1 includes an ISSA 200 that performs one or more intelligent inventory management processes consistent with certain aspects related to the present invention. Each of these inventory management processes may be performed in response to a user accessing ISSA 200 via user interface 210 and/or in response to a request initiated from a non-user source, such as another task, process, and or computing entity. FIGS. 5-7 show flowcharts of various exemplary inventory processes that may be performed by environment 110-1 consistent with certain aspects related to the present invention.

FIG. 5 shows an exemplary inventory analysis process that may be performed consistent with certain aspects related to the present invention. Initially, environment 110-1 may perform processes that determine the inventory of items in inventory 170 (Step 510). This step may be initiated by a user, via interface 210 and the pages described with respect to FIG. 4. Alternatively, a process performed by ISSA 200 or a job performed by Jobs 240, may periodically initiate the collection of inventory information. Also, Step 510 may be initiated by an event detected by one or more sensors (e.g., software and/or hardware based sensors) located in environment 110-1. Once environment 110-1 collects the inventory information (e.g., the number of items of each type included in inventory 170), it may be stored in database 215 for subsequent access. Further, the inventory information may be used by ISSA 200 to produce a report and/or content that is provided to a user through various types of medium, such as a printer, web page, telephonic message, etc.

Environment 110-1 may also determine whether a number of items of any type in inventory 170 is below a predetermined level (Step 520). Environment 110-1 may execute the appropriate processes described above (e.g., via view SKUs out of limits page 418, out of stock control task 231, etc.) to determine and identify an inventory of items of any type has fallen below the predetermined level for that type. If so, (Step 520; YES), an appropriate item below stock level process may be performed (Step 530). This process may include providing an alert message to a user via an output device (e.g., display 204, a pager, cell phone, etc.) indicating which item type needs restocking and the location of the depleted items in environment 110-1. Once the user is notified, he/she may determine whether there are any additional items of the depleted type in an alternate location, such as in a back room. Alternatively, ISSA 200 may indicate to the user whether there is additional inventory of the item type in environment 110-1. Accordingly, the user or ISSA 200 may re-order stock if additional items are needed. Further, step 530 may include providing a customer message on a shelf display located on or near the location where the depleted inventory of items was determined. In one aspect, a store manager or ISSA 200, for example, may formulate customized messages based on the depleted inventory notification that provide various information to a customer that happens to view the shelf display. The customized messages may include offered discounts, rain checks, location information of alternate environments that have the missing items in stock, etc.

Environment 110-1 may also determine whether there are any misplaced items in inventory 170 (Step 540). Environment 110-1 may execute the appropriate processes described above (e.g., via misplaced SKUs page 422, and out of stock control task 231) to determine and identify any misplaced items in inventory 170. If there is a misplaced item or items (Step 540; YES), environment 110-1 may perform an appropriate misplaced item process (Step 550). This process may include providing a user with information including a location of the missing item and/or its intended location (i.e., where inside a store the item belongs). A user (e.g., stock person) may be directed to the current location of the misplaced item(s) so that they may return these item(s) to their designated location within environment 110-1.

Also, environment 110-1 may determine information associated with any lost sales based on missing or misplaced items in inventory 170 (Step 550). This step may include generating and providing a lost sales report (via, for example, out of stock task 231) reflecting revenue that is lost based on the item type being out of stock or having a depleted number of items. Further, an influenced sales report may be generated by ISSA 200 and provided to a user that includes information that correlates various factors (e.g., price of the items, seasonality factors, sales of other items, etc.) to previous and current sales of items of the type that has a depleted inventory. A user may use the influenced sales report to determine whether any adjustments are needed, such as moving the items of the depleted item type to other locations, price, stock order schedules, etc.

FIG. 6 shows a flowchart of a shrinkage process that may be performed by environment 110-1 consistent with certain aspects related to the present invention. Environment 110-1 may initially determine whether a shrinkage event occurred (Step 610). As discussed above, a shrinkage event may be associated with a condition where a predetermined number of items have been removed from their current location within a predetermined period of time. Accordingly, if a large number of items of the same type are taken from a shelf in a manner of minutes, a shrinkage event may have occurred depending on the values set by a user for the predetermined number of items and time period for such shrinkage events and the type of items being effected. If such an event has occurred (Step 610; YES), then environment 110-1 may perform a shrinkage event process (Step 620). If a shrinkage event has not occurred, the process ends.

Step 620 may include various processes performed by a user and/or ISSA 200 as previous explained with respect to shrinkage pages 430-434 and/or shrinkage process 232. For example, environment 110-1 may provide an alert message to a user including information specific to the determined shrinkage event (e.g., location of the event, the type of items that have been removed, and in what time frame). Thus, a store employee may receive the alert message and s directed to the location to perform various tasks, such as security services, and/or customer service functions. Also, step 620 may activate one or more security devices, systems, etc., to monitor the location surrounding the shrinkage event. For example, environment 110-1 may activate a camera to record any physical actions performed by the users at or near the location where in the shrinkage event took place.

FIG. 7 shows a flowchart of an exemplary recall process consistent with certain aspects related to the present invention. Environment 110-1 may execute the appropriate processes described above (e.g., via rapid recall pages 436-442 and out of rapid recall task 233) to handle any recall events associated with items included in inventory 170. In one aspect, environment 110-1 may determine whether a shelf life or expiration event is detected (Step 710). This step may be associated with determining whether inventory 170 includes any items that have a corresponding shelf life and/or expiration date that has been exceeded and/or is close to being exceed (e.g., within a day, a few days, a week, etc.). If such an event is detected (Step 710; YES), an appropriate shelf life/expiration process is performed (Step 720). This step may include notifying a user (e.g., store employee, clerk at a POS location, manager at a home office, etc.) and/or another software process in ISSA 200 that inventory 170 includes one or more items that have either exceeded or is about to exceed, their shelf life and/or expiration dates. The notification may include information identifying each item (e.g., SKU information), their corresponding locations in environment 110-1, whether there is replaceable stock in environment 110-1 with valid shelf lives and/or expiration dates, and/or instructions on how to deal with the event (e.g., remove from shelves, move item(s) to front of a shelf or store location, etc.). The user and/or ISSA 200 receiving the event may use the received information to execute one or more of the suggested instructions, as well as perform other processes to remedy the shelf life/expiration event. These other duties may include changing the price of one or more of the items that are associated with this event. Further, environment 110-1 may display a message at a POS terminal and/or a display device mounted at or near the items related to this event to warn customers and/or employees that certain items may have exceeded their shelf lives or expiration dates.

Further, environment 110-1 may determine whether a temperature event has occurred (Step 730). A temperature event may be associated with a condition where the temperature of an area surrounding, at, or near a particular group of items has changed in such a manner as to possibly damage the items in the group. For example, if a refrigeration unit in environment 110-1 has malfunctioned and the temperature drops below a certain value, any produces stored in the unit may be damaged and deemed unhealthy for sale. If a temperature event has occurred (Step 730; YES), a temperature process is performed (Step 740). In one aspect of the invention, the temperature process may include notifying a user of the temperature event, the location in environment 110-1 associated with the event, instructions on how to deal with the event, item information associated with any items included in the area affected by the event (e.g., SKU information), a time period that the event has occurred and/or is occurring, etc. The user may take appropriate actions to ensure any items affected by the event are safe for purchase (e.g., in the event an event just occurred). The user may relocate these items to a properly operating temperature controlled location in environment 110-1 for further purchase. Further, the user, and or ISSA 200 may provide a repair message to a designated user or use location to request repair of the unit that may have malfunctioned causing the temperature event.

Environment 110-1 may also determine whether any items in inventory 170 are associated with one or more item types that have had a defect reported by a manufacturer (Step 750). This step may include comparing the item information collected from the determined live inventory step 510 shown in FIG. 5 with a received list of defective items provided by the manufacturer. If there are any items of a certain type that matches those found in the defect information provided by the manufacturer, environment 110-1, a defect process may be performed (Step 760). This process may include notifying a user (e.g., customer and/or employee) of the defective items in inventory 170, their location, and information regarding the defect (e.g., the type of defect, whether the item is still safe/operational with the defect, whether the item a POS must be recalled and not sold, etc.). In one aspect, the notified user may be a clerk at location that may facilitate handling the sale of the defective item about to be purchased by a customer. For example, depending on the severity of the defect described in the defect information provided in the notification, the clerk may prevent the customer from purchasing the item. Alternatively, if the item may still be brought up to specification by additional parts or software that will be provided by the manufacturer, the clerk may forward this information to the customer and provide information on how to obtain the corrective parts/software for the purchased item. Further, ISSA 200 may automatically provide a discount for the sale price of the defective item. The reduced sale price may be displayed at the POS location or on a display mounted near a location associated with the one or more defective items. Additionally, environment 110-1 may provide services and/or devices that allow the customer who purchased a defective item to correct the item. For example, a workstation may be provided from which the user may download the necessary software code to correct a defect in a program stored on computer readable medium. Further, environment 110-1 may provide these services to customers in a manner where the customer may leave the purchased item with an employee who performs the necessary procedures to correct the item, such as order a missing part from a manufacturer, downloading a corrective software patch, installing a missing part on a defective item, etc.

Additionally, environment 110-1 may also determine whether there are any items in inventory 170 that have undergone a design change by their corresponding manufacturer (Step 770). Similarly with Step 750, environment 110-1 may determine whether a design change has occurred by comparing design change information received from a manufacturer with a current list of inventory information, perhaps provided via the process performed at Step 510 of FIG. 5. If an item type has undergone a design change, (Step 770; YES), a design change process may be performed (Step 780). The design change process may include notifying a user (e.g., employee) of the item type that has been changed, the location(s) of any items of the changed type, instructions on how to deal with this design change event, etc. In one aspect of the invention, the design change process may include moving older items to an alternate location in environment 110-1, such as from a back location on a shelf to a front location to promote their sales before the design changed items. Further, the design change process may include removing the older items from inventory 170, which may be at the directions of the manufacturer.

Although the steps shown in the flowcharts of FIGS. 5-7 are illustrated in particular sequences, methods, systems, and articles of manufacture consistent with aspects of the present invention may perform each of the steps in different sequences, such as a single step, in various combination of steps, and with additional or fewer steps, without departing from the scope of the invention.

CONCLUSION

As described, systems, methods, and articles of manufacture consistent with certain aspects related to the present invention enable an environment to perform item inventory management processes on a real time, or near real time basis, and at a granularity level that provides many options for the environment to achieve its business goals (e.g., increase sales).

The foregoing description of implementations of the invention has been presented for purposes of illustration and description. It is not exhaustive and does not limit the invention to the precise form disclosed. Modifications and variations are possible in light of the above teachings or may be acquired from practicing of the invention. Additional modifications and variations of the invention may be, for example, the described implementation includes software but the present invention may be implemented as a combination of hardware and software or in hardware alone. The invention may be implemented with both object-oriented and non-object-oriented programming systems.

For instance, one skilled in the art will appreciate the ability to implement the present invention using many different types of environments 110-1. For example, in addition to retail environments, aspects of the present invention may be applied to any environment that includes objects (e.g., physical tangible objects, such as inventory) that may be RFID tagged and includes antennae for retrieving information from these tags. For instance, the present invention may be applied in an environment where a business wishes to track individuals throughout its business environment. In such a scenario, the business environment (e.g., building) may have antennae mounted in various strategic locations (e.g., doorways, elevators, etc.). Each employee of the business may be issued an RFID card, much like those described previously (e.g., customer RFID card). Thus, ISSA 200 may be able to monitor the movements of a user within the business environment based on information received/collected from the antennae as the employee moves past them.

Additionally, interface 210 may include other types of interfaces that interact with various processes performed by ISSA 200. For example, various user interfaces may operate that interact with the EPC writer process to allow a user to not only read and write EPC data from/to the RFID tags 280 in inventory 170, but also to monitor the status of such operations. For example, interface 210 may include results interface that presents to a user a results window that includes a list of all items that were entered via an EPC writer window. The results window may include information that indicates whether an EPC write operation was successfully performed. Various interactive display messages may be provided to the user based on the results of any EPC writes. For example, the result window may present one or more error messages indicating a reason why an EPC write was not successful and instructions on how to possibly correct the problem. Also, interface 210 may include a bad tag finder interface that enables a user to request information on any malfunctioning RFID tags 280. The bad tag interface may present to the user information identifying the ID of any bad tags, their location, and the associated item associated with the tag.

Although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A method for managing an inventory of items using a computer system that executed an inventory management system program that is coupled to a wireless data collection system, each item being positioned in one of a plurality of respective locations within an environment having a plurality of respective locations including a first location such that those items stored therein are available for customer review, a second location having a plurality of shelves that is different than the first location such that those items stored therein are available for customer review, and a third location different from the first location and the second location such that those items stored therein are not available for customer review, the method comprising:

providing item information associated with each item from each corresponding wireless identification device to the computer system using the wireless data collection system, the item information including item identification and item location, the item location indentifying a current one location of the plurality of respective locations for each item, and performing, by executing the inventory management system program on the computer system, an inventory management process based on the item information to provide management information associated with the inventory of items, the inventory management process including an out of stock control process, wherein the out of stock control process includes:

(i) determining by executing the inventory management system program on the computer system, a current inventory count of each item type for all items of any type located in the plurality of respective locations within the environment based on the item information retrieved from one or more of the wireless identification devices, (ii) determining, by executing the inventory management system program on the computer system, when a number of items of a same type in the inventory falls below a first threshold value for a corresponding location within the environment based on the information retrieved from one or more of the wireless identification devices; and (iii) determining, by executing the inventory management system program on the computer system, whether there exists any particular item types which are located only in the third location and not in any of the plurality of locations within the environment, and identifying certain ones of those particular item types for placement within the environment in another of the plurality of locations other than the third location.

2. The method of claim 1, wherein the determining the current inventory count includes:

retrieving the item information associated with each item from a database, wherein the database previously received the item information from a collection process that collects the item information from each wireless identification device; and determining, by executing the inventory management system program on the computer system, the count of each item type based on the retrieved item information.

3. The method according to claim 1, wherein the out of stock control process further includes:

determining by executing the inventory management system program on the computer system, an alternate location within the environment and different from a present location to position certain items that have a history of sales below a second threshold value at the present location.

4. The method according to claim 1, wherein the out of stock control process further includes determining, be executing planogram software on the computer system, a shelf location from the plurality of shelves within the second location where replenished items are needed upon determination that a number of items of another same type in the shelf location of the second location falls below a shelf threshold value.

5. The method of claim 1, wherein the inventory management process further includes determining an alternate location within the environment, and wherein determining the alternate location within the environment includes:

determining whether a specified type of item has a history of sales below a second threshold value in the environment; and determining an alternate location within the environment to reposition items of the specified item type included in the inventory based on a history of sales of items associated with the alternate location.

6. The method of claim 1 wherein the inventory management process further includes providing an out of stock message, and wherein providing the out of stock message includes:

determining whether items of the certain type are no longer located in their respective locations based on the inventory count; and generating the out of stock message that includes at least one of an indication that the item type is out of stock, an offer for a discounted sale price on an item of the certain item type, a rain check for an item of the certain type, and an indication of an alternate location outside the environment where an item of the certain type may be located.

7. The method of claim 1, wherein the inventory management process further includes providing an indication reflecting a query of a database associated with the inventory management system, and wherein the providing the indication includes providing a message displayed on a display device mounted in proximity of a queried item's respective location in the environment.

8. The method of claim 7, wherein the message includes at least one of an indication that the queried item is not available in the environment, an offer for a discount on a sale price of the queried item, and indication reflecting one or more alternative environments that the queried item is not available, and directions to the one or more alternative environments.

9. The method of claim 1, further including providing an indication to a user interface regarding a particular item, wherein the user interface is located on a structure that previously supported the particular item.

10. The method of claim 1, wherein the out of stock control process includes determining an inventory characteristic for certain ones of the items, wherein the inventory characteristic is a mathematical relationship between previous sales of each of the certain ones of the items over a predetermined time period.

11. The method of claim 10, wherein the mathematical relationship represents whether the previous sales of the type of certain ones of the items have been sporadic or uniform over the predetermined time period.

12. A system for managing an inventory of items, each item being positioned in one of a plurality of respective locations within an environment and being associated with a corresponding wireless identification device, the environment having a plurality of respective locations including a first location such that those items stored therein are available for customer review, a second location having a plurality of shelves that is different than the first location such that those items stored therein are available for customer review, and a third location different from the first location and the second location such that those items stored therein are not available for customer review, the system comprising:

a wireless data collection system:

a computer system;

means for providing item information associated with each item from each corresponding wireless identification device to the computer system using the wireless data collection system, the item information including item identification and item location, the item location identifying a current one location of the plurality of respective locations for each item, and means for performing an inventory management process by executing the inventory management system program on the computer system based on the item information to provide management information associated with the inventory items, the means for performing the inventory management process including means for performing an out of stock control process, wherein the means for performing the out of stock control process includes:

(i) means for determining a current inventory count of each item type for all items of any type located in the plurality of respective locations within the environment based on the item information retrieved from one or more of the wireless identification devices, (ii) means for determining when a number of items of a same type in the inventory falls below a first threshold value for a corresponding location within the environment based on the information retrieved from one or more of the wireless identification devices; and (iii) means for determining whether there exists any particular item types which are located only in the third location and not in any of the other plurality of locations within the environment; and means for identifying certain ones of those particular item types for placement within the environment in another of the plurality of locations other than the third location.

13. The system of claim 12, wherein the means for determining a current inventory count includes:

means for retrieving the item information associated with each item from a database, wherein the database previously received the item information from a collection process that collects the item information from each wireless identification device; and means for determining the count of each item type based on the retrieved item information.

14. The system according to claim 12, wherein the means for performing the out of stock control process further includes:

means for providing an out of stock message to a display device for certain misplaced items.

15. The system according to claim 12, wherein the means for performing the out of stock control process further includes:

means for determining an alternate location within the environment and different from a present location to position certain items that have a history of sales below a second threshold value at the present location.

16. The system according to claim 12, wherein the means for performing the out of stock control process further includes means for determining, using a planogram process, a shelf location from the plurality of shelves within the second location where replenished items are needed upon determination that a number of items of another same type in the shelf location of the second location falls below a self threshold value.

17. The system of claim 12, wherein the first threshold value is provided by one of a user and a threshold determination process.

18. The system of claim 12, wherein the inventory management process further includes means for determining an alternate location within the environment, and wherein determining the alternate location within the environment includes:

means for determining whether a specified type of item has a history of sales below a second threshold value in the environment; and means for determining an alternate location within the environment to reposition items of the specified item type included in the inventory based on a history of sales of items associated with the alternate location.

19. The system of claim 12, wherein the inventory management process further includes means for providing an out of stock message, and wherein the means for providing the out of stock message includes:

means for determining whether items of the certain type are no longer located in their respective locations based on the inventory count; and means for generating the out of stock message that includes at least one of an indication that the item type is out of stock, an offer for a discounted sale price on an item of the certain item type, a rain check for an item of the certain type, and an indication of an alternate location outside the environment where an item of the certain type may be located.

20. The system of claim 12, wherein the inventory management process further includes means for providing an indication reflecting a query of a database associated with the inventory management system, and wherein the means for providing the indication includes means for providing a message displayed on a display device mounted in a proximity of a queried item's respective location in the environment.

21. The system of claim 20, wherein the message includes at least one of an indication that the queried item is not available in the environment, an offer for a discount on a sale price of the queried item, and indication reflecting one or more alternative environments that the queried item is available, and directions to the one or more alternative environments.

22. The system of claim 12, further including means for providing an indication to a user interface regarding a particular item, wherein the user interface is located on a structure that previously supported the particular item.

23. The system of claim 12, wherein the means for performing the out of stock control process includes means for determining an inventory characteristic for certain ones of the items, wherein the inventory characteristic is a mathematical relationship between previous sales of each of the certain ones of the items over a predetermined time period.

24. The system of claim 23, wherein the mathematical relationship represents whether the previous sales of the type of certain ones of the items have been sporadic or uniform over the predetermined time period.

25. A non-transitory computer-readable medium including instructions for performing a method, when executed by a processor, for managing an inventory of items, each item being positioned in one of a plurality of respective locations within an environment and being associated with a corresponding wireless identification device, the environment having a plurality of respective locations including a first location such that those items stored therein are available for customer review, a second location having a plurality of shelves that is different than the first location such as those items stored therein are available for customer review, and a third location different from the first location and the second location such that those items stored therein are not available for customer review, the instructions for performing the method comprising:

provided item information associated with each item from each corresponding wireless identification device; and performing an inventory management process based on the item information to provide management information associated with the inventory of items, the inventory management process including an out of stock control process, wherein the out of stock control process includes:

(i) determining a current inventory count of each item type for all items of any type located in the plurality of respective locations within the environment based on the item information retrieved from one or more of the wireless identification devices, (ii) determining when a number of items of a same type in the inventory falls below a first threshold value for a corresponding location within the environment based on the information retrieved from one or more of the wireless identification devices; and (iii) determining whether there exists any particular item types which are located only in the third location and not in any of the other plurality of locations within the environment; and identifying certain ones of those particular item types for placement within the environment in another of the plurality of locations other than the third location.

26. The non-transitory computer-readable medium of claim 25, wherein the determining the current inventory count includes:

retrieving the item information associated with each item from a database, wherein the database previously received the item information from a collection process that collects the item information from each wireless identification device; and determining the count of each item type based on the retrieved item information.

27. The non-transitory computer readable medium according to claim 25, wherein the out of stock control process further includes:

determining an alternate location within the environment and different from a present location to position certain items that have a history of sales below a second threshold value at the present location.

28. The non-transitory computer readable medium according to claim 25, wherein the out of stock control process further includes determining, using a planogram process, a shelf location from the plurality of shelves within the second location wherein replenished items are needed upon determination that a number of items of another same type in the shelf location of the second location falls below a shelf threshold value.

29. The non-transitory computer readable medium of claim 25, wherein the inventory management process further includes determining an alternate location within the environment, and wherein determining the alternate location within the environment includes:

determining whether a specified type of item has a history of sales below a second threshold value in the environment; and determining an alternate location within the environment to reposition items of the specified item type included in the inventory based on a history of sales of items associated with the alternate location.

30. The non-transitory computer readable medium of claim 25 wherein the inventory management process further includes providing an out of stock message, and wherein providing the out of stock message includes:

determining whether items of the certain type are no longer located in their respective locations based on the inventory count; and generating the out of stock message that includes at least one of an indication that the item type is out of stock, an offer for a discounted sale price on an item of the certain item type, a rain check for an item of the certain type, and an indication of an alternate location outside the environment where an item of the certain type may be located.

31. The non-transitory computer readable medium of claim 25, wherein the inventory management process further includes providing an indication reflecting a query of a database associated with the inventory management system, and wherein the providing the indication includes providing a message displayed on a display device mounted in a proximity of a queried item's respective location in the environment.

32. The non-transitory computer readable medium of claim 31, wherein the message includes at least one of an indication that the queried item is not available in the environment, an offer for a discount on a sale price of the queried item, an indication reflecting one or more alternative environments that the queried item is available, and directions to the one or more alternate environments.

33. The non-transitory computer readable medium of claim 25, further including providing an indication to a user interface regarding a particular item, wherein the user interface is located on a structure that previously supported the particular item.

34. The non-transitory computer readable medium of claim 25, wherein the out of stock control process includes determining an inventory characteristic for certain ones of the items, wherein the inventory characteristic is a mathematical relationship between previous sales of each of the certain ones of the items over a predetermined time period.

35. The non-transitory computer readable medium of claim 34, wherein the mathematical relationship represents whether the previous sales of the type of certain ones of the items have been sporadic or uniform over the predetermined time period.

* * * * *